United States Patent
Sugimura et al.

(10) Patent No.: US 6,246,923 B1
(45) Date of Patent: Jun. 12, 2001

(54) CONTROL DEVICE FOR A WORK CARRYING SYSTEM

(75) Inventors: Shunsuke Sugimura, Hiratsuka; Matsuo Nose, Chigasaki, both of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/150,980

(22) Filed: Sep. 11, 1998

(30) Foreign Application Priority Data

Mar. 18, 1996 (JP) .............................. 61 227/1996

(51) Int. Cl.[7] .................................................. G60F 7/00
(52) U.S. Cl. ................. 700/218; 700/214; 700/228; 700/229; 414/217; 901/1; 901/20
(58) Field of Search .................... 700/218, 245, 700/250, 255, 213, 214, 215, 216, 217; 901/20, 1; 414/217, 416

(56) References Cited

U.S. PATENT DOCUMENTS

| | | | |
|---|---|---|---|
| 3,799,057 | * | 3/1974 | Cassel ........................ 104/1 |
| 4,260,940 | * | 4/1981 | Engleberger et al. ............. 318/562 |
| 4,699,575 | * | 10/1987 | Geisel et al. ................. 418/104 |
| 4,916,636 | * | 4/1990 | Torii et al. .................. 364/513 |
| 4,972,131 | * | 11/1990 | Kojyo et al. ............... 318/568.1 |
| 5,012,169 | * | 4/1991 | Ono et al. ................... 318/568 |
| 5,049,029 | * | 9/1991 | Mitsui et al. ................ 414/744.5 |
| 5,243,690 | * | 9/1993 | Chmielewski, Jr. et al. ........ 395/97 |
| 5,280,983 | * | 1/1994 | Maydan et al. ................ 294/119.1 |
| 5,331,542 | * | 7/1994 | Itoh ......................... 364/167.01 |
| 5,363,872 | * | 11/1994 | Lorimer ........................ 137/1 |
| 5,379,984 | * | 1/1995 | Coad et al. .................... 251/298 |
| 5,456,561 | * | 10/1995 | Poduje et al. .................. 414/225 |
| 5,583,408 | * | 12/1996 | Lowrance ..................... 318/568.1 |
| 5,687,294 | * | 11/1997 | Jeong .......................... 395/93 |
| 5,706,634 | * | 1/1998 | Edwards et al. ................. 53/473 |
| 5,738,767 | * | 4/1998 | Coad et al. ................... 204/192.12 |

(List continued on next page.)

FOREIGN PATENT DOCUMENTS

WO 88/08561 * 11/1988 (WO) ........................... B25J/9/16

OTHER PUBLICATIONS

Shiller, Zvi, and Gwo, Yu–Rwei, Dynamic Motion Planning of Autonomous Vehicles, IEEE Transactions on Robotics and Automation, v7 n2, Apr. 1991.*

(List continued on next page.)

Primary Examiner—Christopher P. Ellis
Assistant Examiner—Michael E. Butler
(74) Attorney, Agent, or Firm—Welsh & Katz, Ltd.

(57) ABSTRACT

A control device for a work carrying system characterized in that a first point where the moving action of a work transitions from a moving action from an origin process chamber to a transfer chamber to a moving action inside the transfer chamber and a second point where the moving action of the work transitions from the moving action inside the transfer chamber to a moving action from the transfer chamber to a destination process chamber are set on a moving path of the work, and that speed patterns on the moving path are set based on a transfer distance of the work and time required to open and close gate means of the origin and destination process chambers such that the opening of a gate valve at the destination is completed when the work reaches the second point on the moving path and that a transfer time from the first point to the second point becomes the shortest time which is longer than the opening and closing time of the gate valve, the speed of a work carrying robot being controlled in accordance with the set speed patterns, whereby any chance of the robot being temporarily stopped is minimized so as to effect high-speed carrying of a work such as a wafer requiring a shortest possible carrying time.

6 Claims, 15 Drawing Sheets

U.S. PATENT DOCUMENTS

| | | | |
|---|---|---|---|
| 5,788,447 | * | 8/1998 | Yonemitsu et al. ................... 414/217 |
| 5,801,945 | * | 9/1998 | Comer .............................. 364/468.06 |
| 5,834,916 | * | 11/1998 | Shimogama et al. ........... 318/568.13 |
| 5,838,121 | * | 11/1998 | Fairbairn et al. ....................... 318/45 |
| 5,855,681 | * | 1/1999 | Maydan et al. ...................... 118/719 |
| 5,943,484 | * | 8/1999 | Milne et al. ......................... 395/500 |
| 5,944,940 | * | 8/1999 | Toshima ............................... 156/345 |
| 5,961,269 | * | 10/1999 | Kroeker ............................... 414/221 |
| 5,980,194 | * | 11/1999 | Freerks et al. ....................... 414/754 |
| 6,002,971 | * | 12/1999 | Lucas .................................... 700/250 |
| 6,007,229 | * | 12/1999 | Parnell, Sr. et al. ................. 364/468 |
| 6,044,576 | * | 4/2000 | Kato et al. ............................. 34/406 |

OTHER PUBLICATIONS

Fiorini, Paolo and Shiller, Zvi, Time Optimal Trajectory Planning in Dynamic Environments, IEEE International Conference on Robotics and Automation, Apr. 1996.*

Hooper, R.Tesar, D., Motion coordination based on multiple performance criteria with a hyper–redundant serial robot example, Intelligent Control, p133–138, Aug. 1995.*

Rai, Sudhendu, Design Optimization of Robots Based on Time Optimal Control, IEEE Conference on Control Applications, Sep. 1998.*

Adams, Martin D., Adaptive Motor Control to Aid Mobile Robot Trajectory Execution in the Presence of Changing System Parameters, IEEE transactions on Robotics and Automation, v 14 No. 6, Sep. 1998.*

* cited by examiner

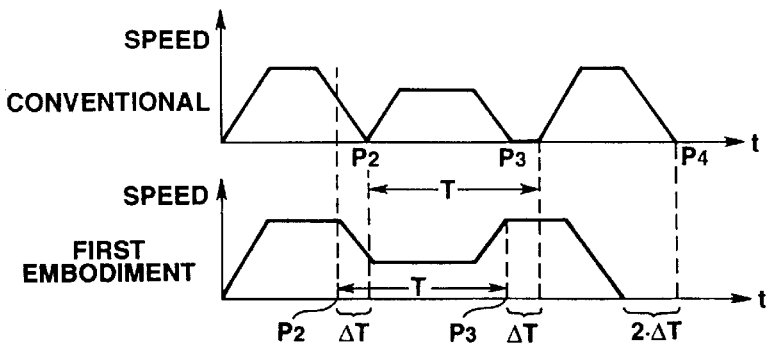
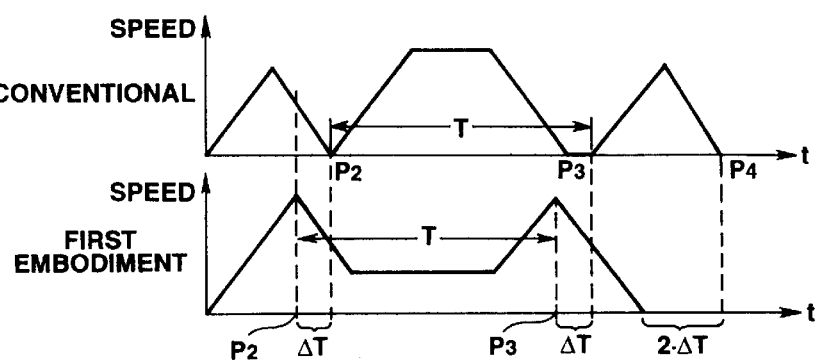
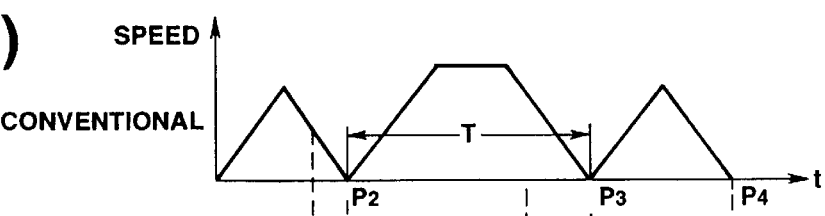
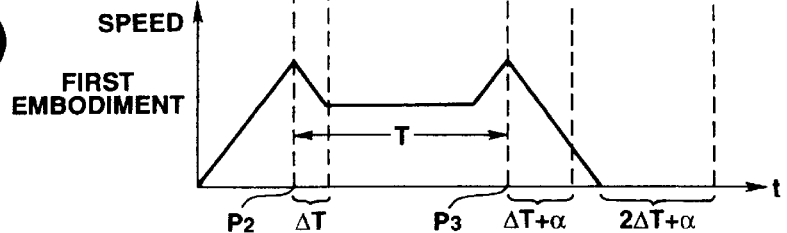

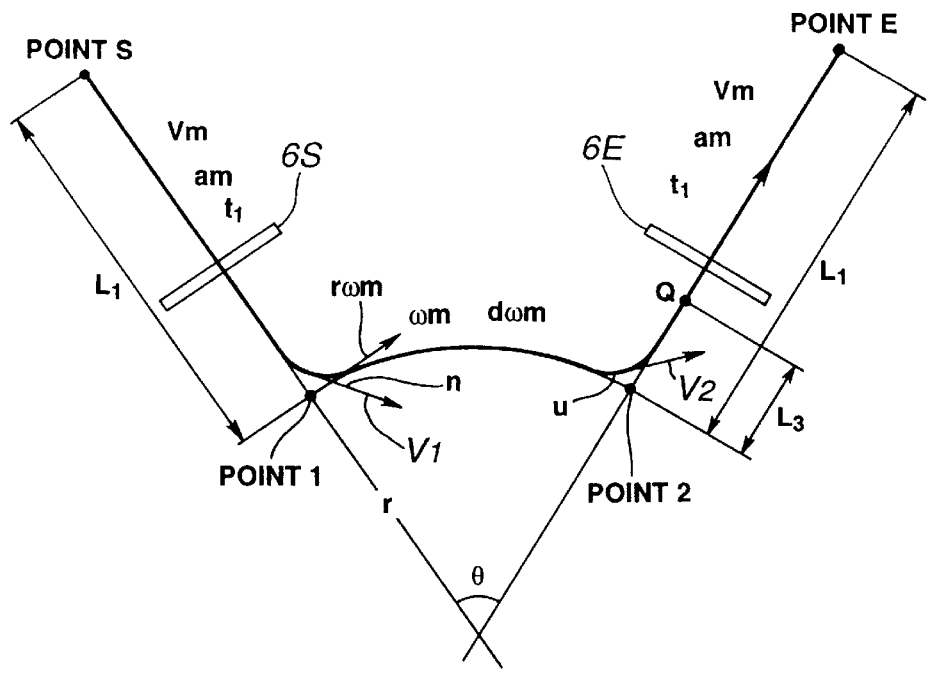
FIG.11
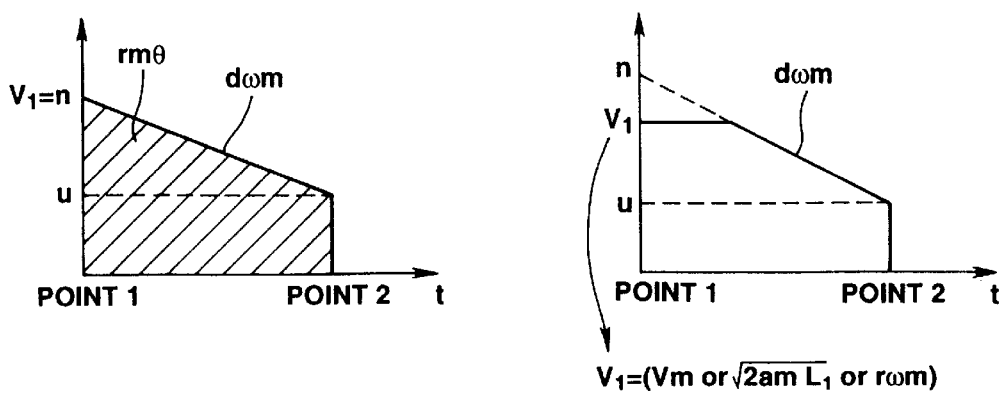
FIG.12(a)            FIG.12(b)

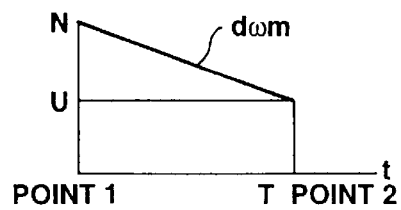
FIG.13(a)
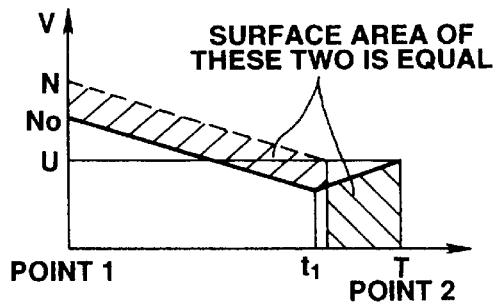
FIG.13(b)
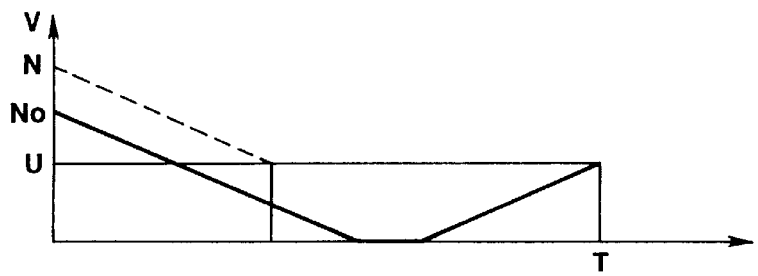
FIG.13(c)
FIG.13(d)
FIG.13(e)

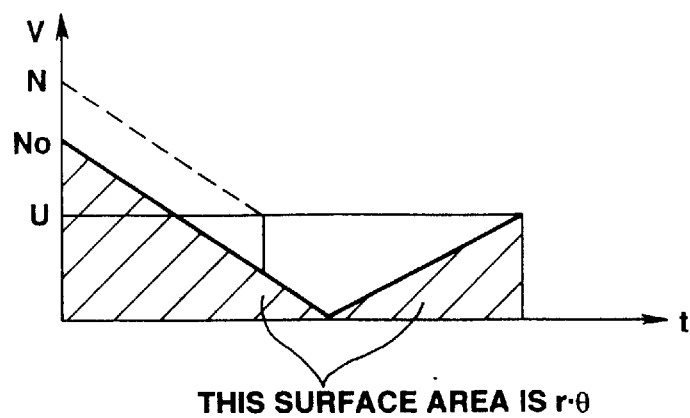
FIG.14
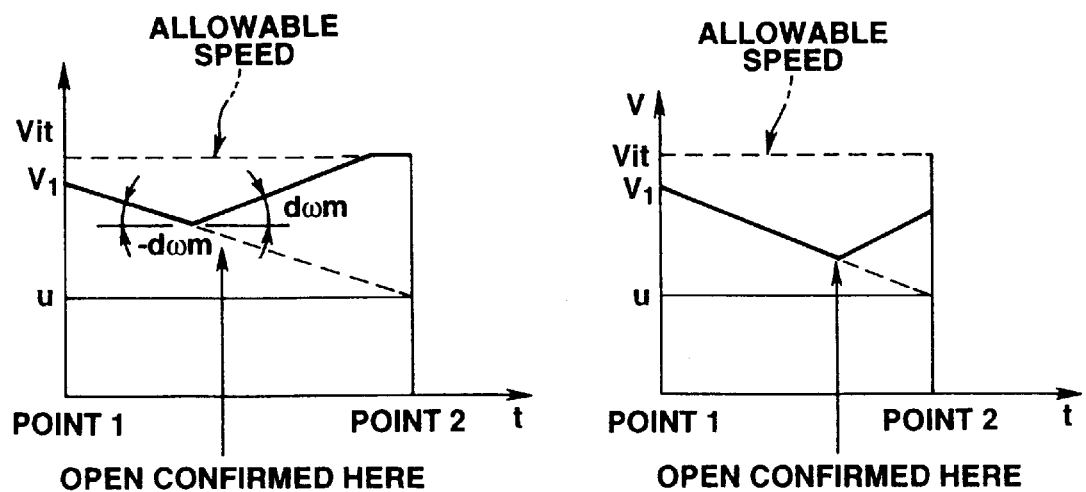
FIG.15(a)      FIG.15(b)

CONTROL DEVICE FOR A WORK CARRYING SYSTEM

TECHNICAL FIELD

The present invention is applied to a semiconductor manufacturing apparatus and best relates to the realization of an efficient carrying action for a work carrying robot in a multi-chamber type manufacturing system wherein a plurality of process chambers are provided which are adjacent to one transfer chamber provided with a work carrying robot. This work carrying robot carries a work such as a wafer or an LCD from one process chamber to another process chamber.

BACKGROUND ART

This kind of multi-chamber type manufacturing apparatus is comprised, for example, as shown in FIG. 16.

In FIG. 16, around the periphery of a transfer chamber 2 wherein a wafer carrying robot 1 is disposed are provided process chambers 3a to 3e which implement various types of semiconductor processes on wafers, a work carry in chamber 4 that carries in the work from an external location, and a work carry out chamber 5 that carries out the work to an external location.

Adjustable open/close gate valves 6a to 6g are disposed between process chambers 3a to 3e and transfer chamber 2, between transfer chamber 2 and work carry in chamber 4, and between transfer chamber 2 and work carry out chamber 5. By means of opening these gate valves 6a to 6g, each chamber is made to connect. Further, transfer chamber 2, process chambers 3a to 3e, work carry in chamber 4 and work carry out chamber 5 are maintained in a vacuum state. Further, the degree of vacuum is made to grow larger in order from work carry in chamber 4 and work carry out chamber 5→transfer chamber 2→process chambers 3a to 3e. Gate valves 6a to 6g are restricted in that two or more gate valves cannot be opened simultaneously in order to maintain the degree of vacuum. In other words, when one gate valve opens, opening control of required gate valves starts in a state in which all the other gate valves are closed.

Moreover, a work carry in robot 9 and a work carry out robot 10 are disposed on a work carry in station 7 and a work carry out station 8, respectively. Work carry in station 7 and work carry out station 8 are disposed adjacent to work carry in chamber 4 and work carry out chamber 5. These work carry in robot 9 and work carry out robot 10 implement a carry in and a carry out of the work (wafer) between the carrying system and an external location. In addition, the region on side A in FIG. 16 is an unmanned region and the region on side B is a manned clean room.

In contrast, as shown in FIG. 17, wafer carrying robot 1 disposed in transfer chamber 2 is, for example, a so-called frog-leg type robot comprised by two arms 11, 12 which have a rotation degree of freedom, and a hand 13 shaped like a platform. A wafer detection sensor (not shown in figure) is housed within hand 13. This wafer detection sensor detects whether a wafer W is loaded. Further, wafer W is supported by a lifter (not shown in figure) that can rise and fall. When wafer W loads onto hand 13 of robot 1, the lifter falls.

In this composition, the procedure when wafer carrying robot 1 transfers wafer W from process chamber 3c to process chamber 3d is shown below.

At first, when the lifter that is supporting wafer W within process chamber 3c is lowered and wafer W is loaded onto hand 13 of wafer carrying robot 1 (FIG. 17 point P1), the wafer detection sensor housed within hand 13 turns ON. When this ON state is confirmed, robot 1 tightens arms 11, 12 and wafer W moves to point P2. Then, when wafer W completes the move to point P2, robot 1 stops at this point P2 once and then outputs a withdrawal completion signal to a system controller (not shown in figure) that controls the entire system.

When the above-mentioned withdrawal completion signal is received in the system controller, control starts to close gate valve 6c, Thereafter, when the system controller confirms the closure of gate valve 6c, control executes to open gate valve 6d. In addition, gate valve 6d is made to open after gate valve 6c closes due to the above-mentioned restriction in which two or more gate valves cannot open simultaneously during the open/closing of gate valves 6c, 6d.

In contrast, when robot 1 outputs a withdrawal completion signal to the system controller, the open/close action of gate valves 6c, 6d occurs side-by-side and the robot moves from point P2 to point P3. When point P3 is reached, the procedure stops once again. Then, after robot 1 confirms the open/close state of gate valve 6d at the time when movement stops at point P3 and then confirms the opening of gate valve 6d, movement to point P4 starts. In other words, robot 1 waits at point P3 until the opening of gate valve 6d can be confirmed.

During the movement to point P4, robot 1 extends arms 11, 12 to position P4 where wafer W of process chamber 3d should be loaded and then after a positioning stop occurs at position P4, the robot outputs a movement completion signal to the system controller.

The system controller that received the movement completion signal raises the lifter of process chamber 3d and then loads wafer W onto the lifter from the hand of robot 1. The procedure above is the chain of events in a wafer carrying action.

FIG. 8(a), FIG. 9(a) and FIG. 10(a) show each type of movement speed pattern according to the above-mentioned conventional technology.

Furthermore, in these figures, T is the time (fixed time characteristic to system) required from when gate valve 6c starts to open until gate valve 6d completes the close. This is common to all gate valves.

As is clear from FIG. 8(a), FIG. 9(a) and FIG. 10(a), according to the above-mentioned conventional technology, the robot always stops once at the withdrawal point (P2) from the movement origin process chamber and at the entrance point (P3) toward the transfer destination process chamber. Because of this, time is required for wafer carrying making it impossible to achieve efficient wafer carrying and in addition the throughput (number of processes per unit time) of the process wafer has not improved once at the present.

Thereupon, the temporary stop at above-mentioned points P2 and P3 is simply eliminated. For this case, there are no problems when the distance between the process chambers is sufficiently distant (when the rotation angle is large) although when the distance between the process chambers is short (when the rotation angle is small), if the movement time from point P2 to point P3 becomes shorter than the above-mentioned time T required to open/close the gate valves, the wafer will protrude into the gate valves. Moreover, if this fact is taken into consideration and the robot speed reduced, it will become impossible to determine why the temporary stop at points P2 and P3 is eliminated.

The object of the present invention is to take the above-mentioned points factors into consideration and provide a control device for a work carrying system that can achieve a high-speed work transfer with a transfer speed as short as possible as well as eliminating a temporary stop of the robot as much as possible.

DISCLOSURE OF THE INVENTION

The first invention that corresponds to claim 1 is such that in a work carrying system comprising: a work processing device having a transfer chamber to which a work carrying robot is disposed, a plurality of process chambers disposed adjacent to the transfer chamber which implement various types of processes on a work, and a plurality of gate means each being disposed between each of the process chambers and the transfer chamber; the work carrying robot being adopted to transfer the work positioned at a transfer origin process chamber among the plurality of process chambers to a transfer destination process chamber along a predetermined movement path through the gate means of the transfer origin process chamber, the transfer chamber and the gate means of the transfer destination process chamber, in which a specified open/close time T is required to open and close the gate means of the transfer origin process chamber and of the transfer destination process chamber during the transfer, characterized in that:

a first point where the work on the movement path shifts from a moving action from the transfer origin process chamber to the transfer chamber to a moving action inside the transfer chamber and a second point where the work shifts from the moving action inside the transfer chamber to a moving action from the transfer chamber to the transfer destination process chamber are set; and speed control means is provided which, based on a transfer distance of the work and the open/close time, sets a speed pattern on the moving path so that opening of a transfer destination gate valve is completed at a moment at which the work has reached to the second point on the moving path and a transfer time from the first point to the second point becomes a shortest time which is longer than the open/close time T, and controls a speed of the work carrying robot in accordance with the set speed pattern.

In the first invention, because the opening of the gate valve of the transfer destination completes when the robot passes through the second point and the movement speed pattern is set from the transfer origin process chamber to the transfer destination process chamber such that the transfer time from the first point to the second point becomes the shortest time which is longer the time T required for open/close of the gate means of the transfer origin process chamber and the transfer destination process chamber with this calculated speed pattern being used to drive the robot, the robot will not stop while it is moving which in turn makes it possible to achieve high-speed work transfer action with a short transfer time thereby improving the throughput of the work production.

Furthermore, the second invention that corresponds to claim 3 further adds conditions, in addition to the conditions of the speed pattern of the first invention, that the movement speed at the second point allows the work to stop at a stop point set in front of the gate means of the transfer destination process chamber on the movement path and that the movement speed at the first point can be reduced to the movement speed at the second point.

Further, the work processing device comprises gate open/close detection sensors each detects an open and close state of each of the plurality of gate means;

Further, the invention comprises open/close judgment means that judges open and close state of the gate means of the transfer destination process chamber at a time point when the robot reaches the second point by an output of the gate open/close sensor of the transfer destination process chamber; and stop control means that controls the speed of the robot such that, when the opening of the gate means of the transfer destination process chamber is confirmed by the open/close judgment means, the stop control means does not stop the robot at the stop point but transfers to the transfer destination process chamber and, when the closing of the gate means of the transfer destination process chamber is confirmed by the open/close judgment means, the stop control means stops the robot at the stop point.

According to the second invention, the robot can move without stopping even when the distance between the first point and the second point is short and for a case other than when an abnormality occurs, the robot can achieve an even more efficient work carrying action without stopping in transit.

Next, in addition to the second invention, the third invention that corresponds to claim 4 further comprises second open/close judgment means that constantly judges the open and close state of the gate means of the transfer destination process chamber by the output of the gate open/close sensor of the transfer destination process chamber after the work passed the first point; and acceleration/deceleration switching control means that immediately stops deceleration and executes an acceleration action if the gate means of the transfer destination process chamber is judged by the second open/close judgment means to be open before the work reaches the second point when the deceleration action is executed at the time of the judgment.

In the third invention, because the acceleration/deceleration switching control means is added that immediately stops deceleration and executes an acceleration action when a judgment is made that the gate means of the transfer destination process chamber is open during the movement from the first point to the second point and if deceleration action executes at the time of this judgment, it is possible to achieve an efficient work transfer action in an even shorter time.

The fourth invention that corresponds to claim 6 is such that in a work carrying system comprising: a work processing device having a transfer chamber to which a work carrying robot is disposed, a plurality of process chambers disposed adjacent to the transfer chamber which implement various types of processes on a work, a plurality of gate means each being disposed between each of the process chambers and the transfer chamber, and gate open/close detecting sensors each for detecting open and close state of the plurality of gate means; the work carrying robot being adopted to transfer the work positioned at a transfer origin process chamber among the plurality of process chambers to a transfer destination process chamber along a predetermined movement path through the gate means of the transfer origin process chamber, the transfer chamber and the gate means of the transfer destination process chamber, wherein a specified open/close time is required to open and close the gate means of the transfer origin process chamber and of the transfer destination process chamber during the transfer, characterized in that:

a stop point is previously set at a predetermined position on the movement path before the work reaches the gate means of the transfer destination process chamber and a confirmation point is previously set at a predetermined position on the movement path before the stop point, for confirming the open and close state of the gate means of the transfer destination process chamber; and that the invention comprises:

first speed control means that previously sets a movement speed pattern of the work carrying robot from the transfer origin process chamber to the transfer destination process chamber such that the work transfer time on the movement path becomes a shortest time on a condition that the speed at the confirmation point is set to an upper limit speed that allows the work to stop at the stop point; open/close judgment means that judges the open and close state of the gate means of the transfer destination process chamber at a moment the work passes the confirmation point by an output of the gate open/close sensor of the transfer destination process chamber; and second speed control means that transfers the work to the transfer destination process chamber without stopping at the stop point in accordance with the movement speed pattern set in the first speed control means when the opening of the gate means of the transfer destination process chamber is confirmed by the open/close judgment means and also controls the speed of the robot such that the work stops at the stop point when the closing of the gate means of the transfer destination process chamber is confirmed by the open/close judgment means.

According to the fourth invention, because the speed pattern is set such that the robot can stop at the specified stop point in front of the transfer destination process chamber, the speed pattern is not set such that the transfer time from the first point to the second point becomes is longer than the open/close time T of the gate means of the transfer destination process chamber as in the first invention.

Therefore, according to the fourth invention, the robot can move at a speed pattern with the shortest transfer speed from among the speed patterns that allow the robot to stop at a specified point in front of the transfer destination process chamber when a close of the gate means of the transfer destination process chamber is detected.

The fifth invention that corresponds to claim 7 further adds, in addition to the fourth invention, acceleration/ deceleration switching control means for immediately stopping deceleration and executing an acceleration action before reaching to the confirmation point if it is judged by the second open/close judgment means that the gate means of the transfer destination process chamber is opened and if the deceleration action is executed at the time of this judgment, because of this, it is possible to achieve an efficient work transfer action in an even shorter time.

Next, the sixth invention that corresponds to claim 9 is such that in a work carrying system comprising: a work processing device having a transfer chamber to which a work carrying robot is disposed, a plurality of process chambers disposed adjacent to the transfer chamber and which implement various types of processes on a work, a plurality of gate means each being disposed between each of the process chambers and the transfer chamber, and gate open/close detection sensors that detect each open and close state of each of the plurality of gate means; the work carrying robot having work support arms which allow a first movement relative to a work movement between the process chambers and the transfer chamber as well as a second movement relative to a work movement within the transfer chamber, and being adopted to pass by the first movement the work positioned at a transfer origin process chamber among the plurality of process chambers through the gate means of the transfer origin process chamber to move the work to the inside of the transfer chamber, transfer the work inside of the transfer chamber by the second movement, and pass by the first movement the work positioned within the transfer chamber through the gate means of the transfer destination process chamber to transfer the work to the transfer destination process chamber; wherein a specified open/close time is required to open and close the gate means of the transfer origin process chamber and of the transfer destination process chamber during the transfer, characterized in that the system comprises: speed pattern setting means that previously sets a first speed pattern relative to an acceleration to a deceleration stop of the second movement and a second speed pattern relative to an acceleration to a deceleration stop of the first movement from within the transfer chamber to the transfer destination process chamber that is carried out subsequent to the second movement; open/close judgment means that starts an open/close judgment of the gate means of the transfer destination process chamber based on an output of the gate open/close sensor from a moment when the robot passes a confirmation start point that is a predetermined position enroute on the moving path by the second movement; speed pattern generation means that merges the first speed pattern and the second speed pattern at a moment when the open/close judgment means confirms the opening of the gate means of the transfer destination process chamber; and robot drive means that selects the first speed pattern in connection with the work transfer to the confirmation start point within the transfer chamber, selects a speed pattern generated by the speed pattern generation means from the confirmation start point to the transfer destination process chamber and controls the speed of the work carrying robot in accordance with the selected speed pattern.

According to the sixth invention, the first speed pattern relative to the work movement within the process chamber and the second speed pattern relative to the work movement from the process chamber to the transfer destination process chamber are merged at the moment when the open/close judgment means confirms the gate means of the transfer destination process chamber is open and, in accordance with these merged speed patterns, the speed from the position that corresponds to the moment when the gate means of the transfer destination process chamber is confirmed to be open to the transfer destination process chamber is controlled in order to prevent the work from coming into collision with the gate means without stopping the work as much as possible. Therefore, along with making it possible to reduce the probability that the work must actually stop, it also becomes possible to execute an acceleration action toward the transfer destination process chamber not only from a state in which the robot is completely stopped with a speed of 0 but also in a state that has this approximate speed. Furthermore, in the sixth invention, because the merging of the speed patterns implements a control to prevent the work from protruding toward the gate means, speed patterns previously held for one path are reduced making it possible to conserve memory capacity in addition to simplifying the control structure.

Next, the seventh invention that corresponds to claim 10 stipulates that the second movement, which is the work movement within the process chamber of the sixth invention, is a movement from the approximate front position of the transfer origin process chamber within the transfer chamber to the approximate front position of the transfer destination process chamber within the transfer chamber.

Next, the eighth invention that corresponds to claim 12 is such that in a work carrying system comprising: a work carrying device having a transfer chamber to which a work carrying robot is disposed, a plurality of process chambers disposed adjacent to the transfer chamber and which implement various types of processes on a work, a plurality of gate means each being disposed between each of the process chambers and the transfer chamber, and gate open/close detection sensors that detect each open and close state of the plurality of gate means; the work carrying robot having work support arms which allow a first movement relative to a work movement between the process chambers and the transfer chamber as well as a second movement relative to a work movement within the transfer chamber, and being adopted to pass by the first movement the work positioned at a transfer origin process chamber among the plurality of process chambers through the gate means of the transfer origin process chamber to move the work to the inside of the transfer chamber, to move by the second movement the work positioned at an approximate front of the transfer origin process chamber within the transfer chamber to a position at an approximate front of the transfer destination process chamber within the transfer chamber, and to pass by the first movement the work positioned at the approximate front of the transfer destination process chamber within the transfer chamber through the gate means of the transfer destination process chamber to transfer the work to the transfer destination process chamber; in which a predetermined opening and closing time is required to open and close the gate means of the transfer origin process chamber and the transfer destination process chamber during the transfer, characterized in that the system comprises: speed pattern setting means that previously sets each of a first speed pattern relative to an acceleration to a deceleration stop of the first movement up to a first intersecting point that intersects the first movement from the transfer origin process chamber to the transfer chamber and the second movement, a second speed pattern relative to an acceleration to a deceleration stop of the second movement from the first intersecting point up to a second intersecting point that intersects the second movement and the first movement from the transfer chamber to the transfer destination process chamber, and a third speed pattern relative to an acceleration to a deceleration stop of the first movement from the second intersecting point to the transfer destination process chamber; first speed pattern generation means that merges the first speed pattern and the second speed pattern at a moment when the work passes through a predetermined position previously set between the gate means of the transfer origin process chamber on the transfer path and the first intersecting point; open/close judgment means that starts an open/close judgment of the gate means of the transfer destination process chamber based on an output of the gate open/close sensor from a moment when the robot passes a confirmation start point which is a predetermined position enroute on the path by the second movement; second speed pattern generation means that merges the second speed pattern and the third speed pattern at a moment when the open/close judgment means confirms the opening of the gate means of the transfer destination process chamber; and robot drive means that selects the first speed pattern generation means from the transfer origin process chamber to the confirmation start point, selects the second speed pattern generation means from the confirmation start point to the transfer destination process chamber and controls the speed of the work carrying robot in accordance with the selected speed pattern.

In the eighth invention, at the moment when the work passes through a fixed position previously set between the gate means of the transfer origin process chamber on the above-mentioned transfer path and the first intersecting point, a first speed pattern relative to the movement from the transfer origin process chamber to the first intersecting point and a second speed pattern relative to the movement from the first intersecting point to the second intersecting point are merged to control the speed in accordance with the merged speed patterns. Therefore, the transfer from the movement from the transfer origin process chamber to the transfer chamber toward the movement within the transfer chamber is implemented on a path made by merging the first and second speed pattern which forms a short cut.

Furthermore, in the eighth invention, at the moment when the open/close judgment means confirms the gate means of the transfer destination process chamber is open, the second speed pattern and the third speed pattern relative to the movement from the second intersecting point to the transfer destination process chamber are merged and in accordance with these merged speed patterns, speed control is implemented from the position that corresponds to the moment when the gate means of the transfer destination process chamber is confirmed to be open to the transfer destination process chamber. Therefore, the transfer implements on one path from among a plurality of different shorter paths in proportion to the position that corresponds to the moment when the open/close judgment means confirms the gate means of the transfer destination process chamber is open from the confirmation start point to the transfer destination process chamber.

However, when an open of the gate means of the transfer destination process chamber is not confirmed before the work stops at the second intersecting point, the work will stop once at the second intersecting point and then after the work stops, it will be transferred from the second intersecting point to the transfer destination process chamber at the moment when an open of the gate means of the transfer destination process chamber is confirmed.

According to the eighth invention as described, because the transfer of the work is carried out through the shorter path, the work transfer distance from the transfer origin process chamber to the transfer destination process chamber becomes shorter along with sudden angles which function to alter the direction on the path being eliminated thereby making it possible to transfer the work at high speeds on a gentle curve as well as being able to prevent accidents such as work droppage.

Moreover, according to the eighth invention, by means of merging the speed patterns at the moment when an open of the gate means of the transfer destination process chamber is confirmed and using these merged speed patterns to control the speed, protrusion of the work toward the gate means is avoided without stopping the work at the second intersecting point as much as possible. Therefore, along with making it possible to reduce the probability that the work must actually stop, it also becomes possible to execute an acceleration action toward the transfer destination process chamber not only from a state in which the robot is completely stopped with a speed of 0 but also in a state that has this approximate speed.

Furthermore, because the protrusion toward the gate means is controlled by means of the merging of the speed patterns, speed patterns previously held for one path are improved using three speed patterns thereby conserving memory capacity in addition to simplifying the control structure.

Next, the ninth invention that corresponds to claim 13 stipulates the arrangement on the periphery of the plurality of process chambers and the transfer chamber in the eighth invention along with stipulating that the work support arms can rotate and move in a straight line in the centripetal direction and the centrifugal direction.

Next, the tenth invention that corresponds to claim 16 is such that in a work carrying system comprising: a work processing device having a transfer chamber to which a work carrying robot is disposed, a plurality of process chambers disposed adjacent to the transfer chamber which implement various types of processes on a work, and a plurality of gate means each being disposed between each of the process chambers and the transfer chamber; the work carrying robot being adopted to transfer the work positioned at a transfer origin process chamber among the plurality of process chambers to a transfer destination process chamber along a predetermined movement path through the gate means of the transfer origin process chamber, the transfer chamber and the gate means of the transfer destination process chamber, wherein a specified open/close time is required to open and close the gate means of the transfer origin process chamber and the transfer destination process chamber during the transfer, characterized in that:

a confirmation start point is previously set for starting confirmation of the open and close state of the gate means of the transfer destination process chamber at a front position where the work makes contact with the gate means of the transfer destination process chamber on the movement path and a predetermined withdrawal path different from the movement path is previously set as a start point of the confirmation start point; and that the system comprises:

open/close judgment means that starts judgment of the open and close state of the gate means of the transfer destination process chamber based on an output of the gate open/close sensor from a moment the robot passes the confirmation start point; and speed control means that moves the work to the transfer destination process chamber on the movement path when the open/close judgement means confirms the opening of the gate means of the transfer destination process chamber at a moment when the work passes the confirmation start point, selects the withdrawal path and moves the work when the opening of the gate means of the transfer destination process chamber is not confirmed by the open/close judgement means at the moment when the work passes the confirmation start point, and controls a speed of the work carrying robot such that the work is allowed to return to the movement path at the moment when the open/close judgment means confirms the opening of the gate means of the transfer destination process chamber on the withdrawal path.

In the tenth invention, because the speed is controlled such that the work is allowed to move to the transfer destination process chamber on a normal movement path when the gate means of the transfer destination process chamber is confirmed to be open at the moment when the work passes the confirmation start point along with the selecting the withdrawal path when the gate means of the transfer destination process chamber is not confirmed to be open at the moment when the work passes the confirmation start point and then allows the work to move allowing the work to return to the movement path at the moment when the gate means of the transfer destination process chamber is confirmed to be open on the withdrawal path, along with making it possible to reduce the probability that the work must actually stop, it also becomes possible to execute an acceleration action toward the transfer destination process chamber not only from a state in which the robot is completely stopped with a speed of 0 but also in a state that has this approximate speed.

Next, the eleventh invention that corresponds to claim 17 is such that in a work carrying system comprising: a work processing device having a transfer chamber to which a work carrying robot is disposed, a plurality of process chambers disposed adjacent to the transfer chamber which implement various types of processes on a work, a plurality of gate means each being disposed between each of the process chambers and the transfer chamber, and gate open/close detection sensors that detect each open and close state of the plurality of gate means; the work carrying robot being adopted to transfer the work positioned at a transfer origin process chamber among the plurality of process chambers to a transfer destination process chamber along a predetermined reference movement path through the gate means of the transfer origin process chamber, the transfer chamber and the gate means of the transfer destination process chamber, wherein a specified open/close time is required to open and close the gate means of the transfer origin process chamber and the transfer destination process chamber during the transfer, characterized in that:

a confirmation start point is previously set for starting confirmation of the open and close state of the gate means of the transfer destination process chamber at a position before a position where the work makes contact with the gate means of the transfer destination process chamber on the reference movement path, a predetermined withdrawal path different from the reference movement path is previously set taking the confirmation start point as a start point and that extends to a previously set predetermined stop point and a plurality of different return paths are previously set which return the work from each position on the withdrawal path to the reference path; and that:

the system comprises open/close judgment means that starts judgment of the open and close state of the gate means of the transfer destination process chamber based on an output of the gate open/close sensor from a moment the robot passes the confirmation start point; speed pattern setting means that previously sets each of a first speed pattern for moving the work from the transfer origin process chamber to the confirmation start point on the reference movement path, a second speed pattern for moving the work from the confirmation start point to the transfer destination process chamber on the reference movement path, and a plurality of third speed patterns which extend from the confirmation start point to the transfer destination process chamber through the withdrawal path and the return path; and robot drive means that selects the first speed pattern from the transfer origin process chamber to the confirmation start point, selects the second speed pattern when the open/close judgment means confirms the opening of the gate means of the transfer destination process chamber at the confirmation start point, selects the third speed pattern when the open/close judgment means does not confirm opening of the gate means of the transfer destination process chamber at the confirmation start point, and controls the speed of the work carrying robot in accordance with the selected speed pattern.

In the eleventh invention, when the gate means of the transfer destination process chamber is not open at the moment when the work passes the confirmation start point, the withdrawal path wherein the work outside the normal standard path does not make contact with the gate means and the return path toward the standard path away from this withdrawal path are previously set. Further, when the open/close judgment means confirms the gate means of the transfer destination process chamber is open at the confirmation start point, the work transfers to the transfer destination process chamber along the normal standard path and when the open/close judgment means does not confirm the gate means of the transfer destination process chamber is open at the confirmation start point, the work transfers along the withdrawal path. At the moment when the gate means of the transfer destination process chamber is confirmed to be open, the transfer along the return path starts and then after this, the work transfers to the transfer destination process chamber through the return path.

Therefore, in the eleventh invention, when the gate means of the transfer destination process chamber is not confirmed to be open, the work is set free on the withdrawal path and at the moment when the gates means is confirmed to the open,, the work transfers to the transfer destination process chamber through the return path. By means of these actions, protrusion of the work toward the gate means can be avoided without stopping the work as much as possible. Therefore, along with making it possible to reduce the probability that the work must actually stop, it also becomes possible to execute an acceleration action toward the transfer destination process chamber not only from a state in which the robot is completely stopped with a speed of 0 but also in a state that has this approximate speed.

BRIEF DESCRIPTION OF THE DRAWINGS

FIGS. 8(a) and 8(b) show examples of a speed pattern according to a conventional mode and the first mode of the present invention;

FIGS. 9(a) and 9(b) show examples of a speed pattern according to a conventional mode and the first mode of the present invention;

FIGS. 10(a) and 10(b) show examples of a speed pattern according to a conventional mode and the first mode of the present invention;

FIG. 11 shows each type of parameter value used during the calculation of a speed pattern according to the second and third modes of the present invention;

FIGS. 12(a) and 12(b) show speed patterns from the point 1 to the point 2 according to the second mode of the present invention;

FIGS. 13(a) to 13(e) show speed patterns from the point 1 to the point 2 according to the third mode of the present invention;

FIG. 14 describes parameter value N0 used in the third mode of the present invention;

FIGS. 15(a) and 15(b) show speed patterns from the point 1 to the point 2 according to the fourth mode of the present invention;

BEST MODES FOR CARRYING OUT THE INVENTION

In the following, embodiment for carrying out the invention will be described referring to the attached drawings.

Figure 2:
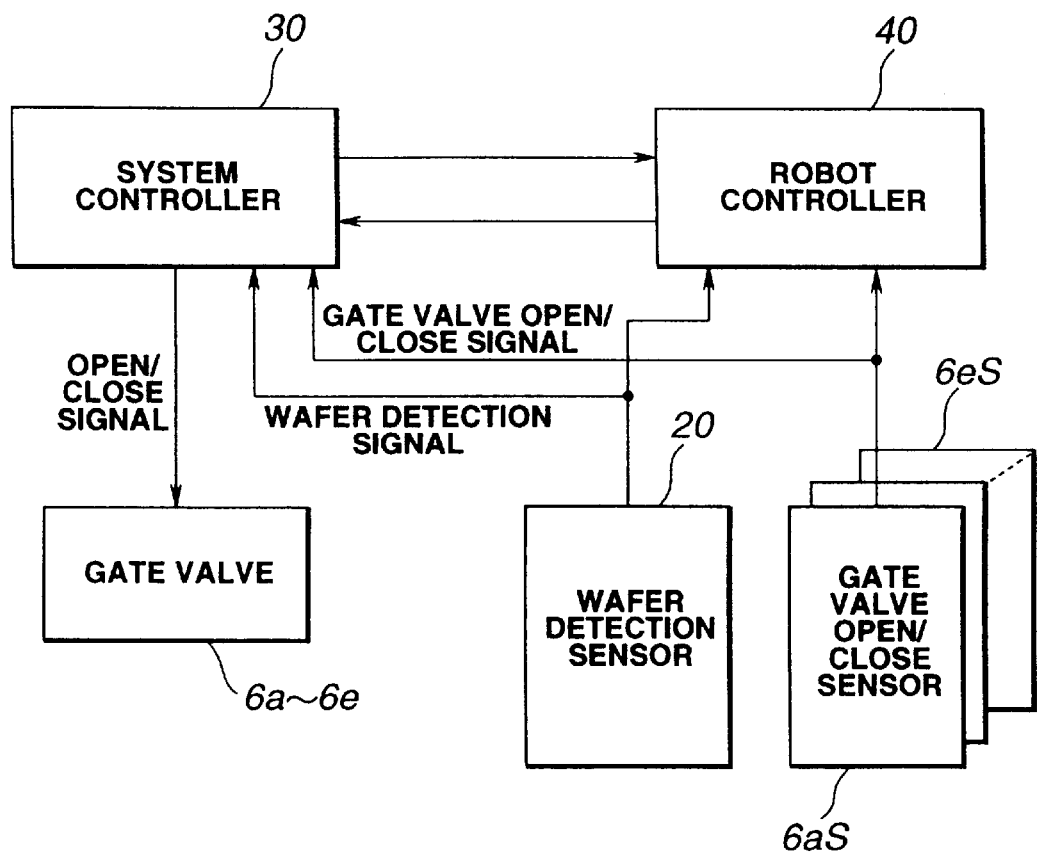
FIG. 2 is a block diagram showing an example of a composition of the control system of the present invention.

FIG. 2 shows an example of a composition of the control system of the present invention. This control system controls the multi-chamber type processing system shown in FIG. 16 and FIG. 17.

Figure 16:
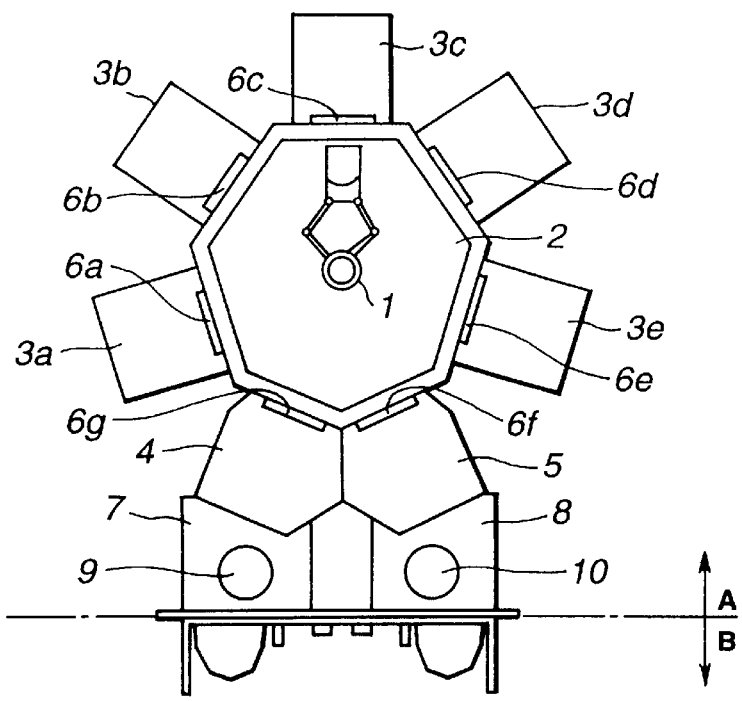
FIG. 16 is a general view showing a multi-chamber type manufacturing system wherein is disposed a wafer carrying robot.
Figure 17:
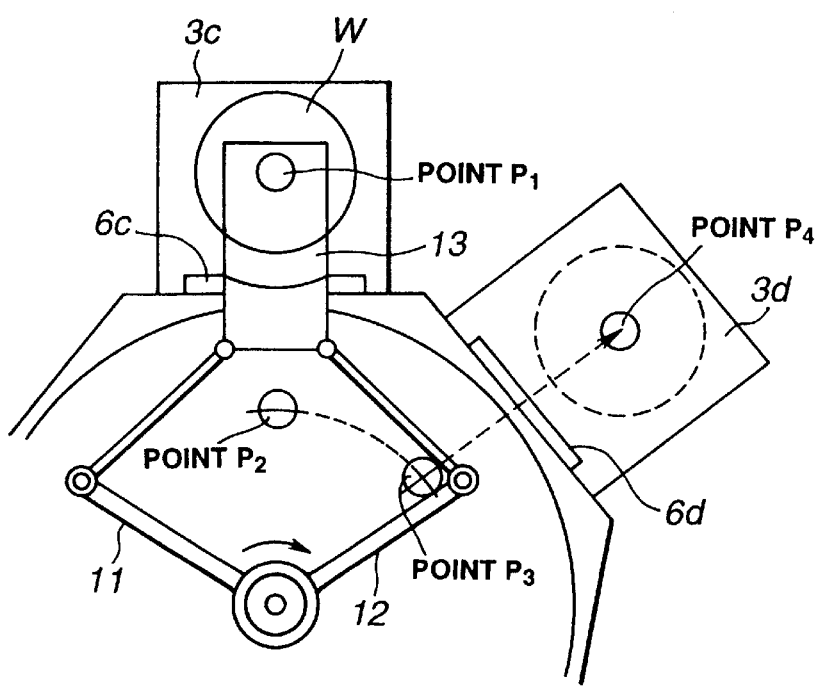
FIG. 17 is a partial structural drawing showing a multi-chamber type manufacturing system wherein is disposed a wafer carrying robot.

In FIG. 2, wafer detection sensor 20 is mounted to hand a; 13 of wafer carrying robot 1 of FIG. 17 and detects whether wafer W is loaded on hand 13. A wafer detection signal is input into system controller 30 and robot controller 40. Gate valve detection sensors 6as to 6es are disposed on gate valves 6a to 6e which are disposed on each process chamber 3a to 3e of FIG. 16. These sensors detect an open and close state of each gate valve 6a to 6e. Gate valve open/close signals detected by means of each of the gate valve detection sensors 6as to 6es are input into system controller 30 and robot controller 40.

System controller 30 provides general control of each compositional element shown in FIG. 16. The control related to the present invention executes as shown below.

(1) Open/close control of gate valves 6a to 6e (2) Instruct the robot start command, chamber number of transfer origin and chamber number of transfer destination when executing a wafer load between process chambers in robot controller 40

(3) Output an abnormal stop command to the robot controller

Robot controller 40 controls the drive of wafer carrying robot 1. The control related to the present invention executes as shown below.

(1) Output a withdrawal completion signal to the system controller if the arms tighten and retract from the transfer origin process chamber when executing a wafer load between process chambers (2) Output a movement completion signal to the system controller when executing a wafer transfer between process chambers if the wafer reaches the transfer destination process chamber However, the following two functions are included in robot controller 40 in order to implement the present invention.

(1) Parallel processing function that allows parallel execution of the reception and transmission of signals between the drive system of the robot and external devices (system controller 30 and wafer detection sensor 20, gate valve detection sensors 6as to 6es)

(2) Pass point function that allows teaching points (such as points P2 and P3 of FIG. 17) other than start points and stop points to pass without being positioned and stopped A first embodiment according to this composition will be described.

When executing a wafer load between process chambers in the first embodiment, a high speed is maintained as much as possible based on the distance between the process chambers to be moved and time T required to open and close the gate valve of each chamber without stopping at the standby point (P2 of FIG. 17) from the transfer origin process chamber and the entrance point (P3 of FIG. 17) to the transfer destination process chamber at the least. And in addition, when the robot reaches the entrance point (P3 of FIG. 17) of the transfer destination process chamber, a transfer speed pattern is obtained that completes the open action of the gate valve of the transfer destination process chamber and then the robot is driven based on this transfer speed pattern.

Figure 3:
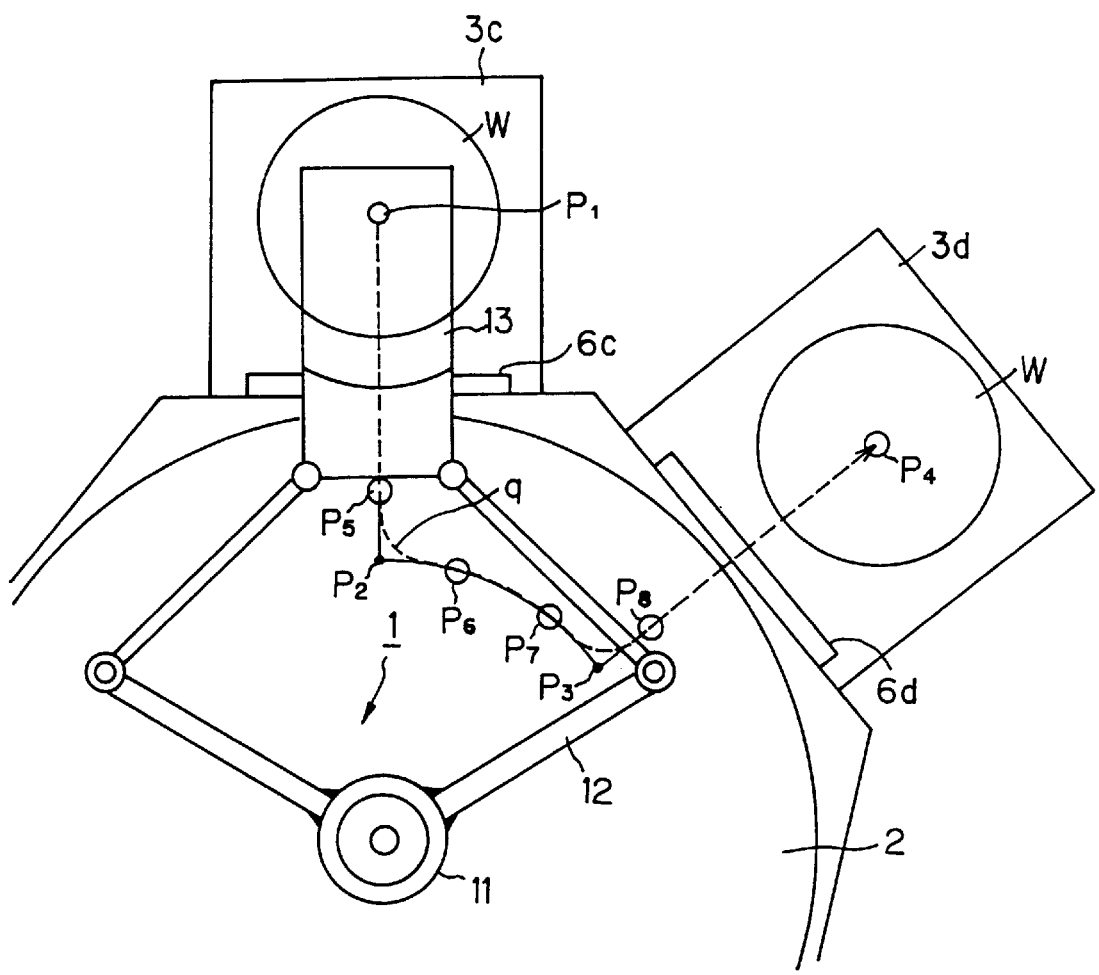
FIG. 3 shows the wafer movement path according to a mode of the present invention.

For example, the broken line q in FIG. 3 represents the transfer path of the center of wafer W from process chamber 3c to process chamber 3d. At first, an outline of the operation of the first embodiment will be described referring to FIG. 3.

To begin, a command is input from system controller 30 to robot controller 40 to move wafer W located within process chamber 3c to process chamber 3d. When robot controller 40 detects that wafer W is loaded onto hand 13 of robot 1 from a detection signal of wafer detection sensor 20 housed inside hand 13 (point P1), arms 11, 12 of robot 1 tighten transferring wafer W to point P5. Then, when robot 1 reaches point P5, robot controller 40 outputs a withdrawal completion signal to system controller 30. Further, the robot does not stop at point P5.

When system controller 30 receives the withdrawal completion signal, the first action is to implement control to close gate valve 6c. When a confirmation using the output of gate valve open/close sensor 6cs is made that gate valve 6c is closed, the next action is to implement control to open gate valve 6d. Further, as described above, due to the limitation in which two or more gate valves cannot be opened simultaneously when opening and closing gate valves 6c, 6d, gate valves 6d opens after gate valves 6c closes.

In contrast, robot 1 implements a rotation movement in parallel with the open/close action of gate valves 6c, 6d from point P5 to point P8 through points P6 and P7. In this embodiment, the speed control of the robot completes the opening of gate valve 6d at the moment when wafer W reaches point P6.

Thereafter, robot 1 continues to move toward point P4 without stopping at point P8. When wafer W reaches point P4, robot controller 40 sends a movement completion signal to system controller 30. The process above is an outline of the wafer carrying action.

Furthermore, a wafer on movement path q for this case is made to move between point P5 and point P6 as well as between point P7 and point P8 by means of a shorter path connected by a curved line such as a circular arc and the work transfer distance from transfer origin process chamber 3C to transfer destination process chamber 3d is shortened along with sudden angles which function to alter the direction on the path being eliminated thereby making it possible to transfer the work at high speeds on a gentle curve as well as being able to prevent accidents such as work droppage.

Next, details of the speed control of robot 1 will be described using FIG. 4.

Figure 4:
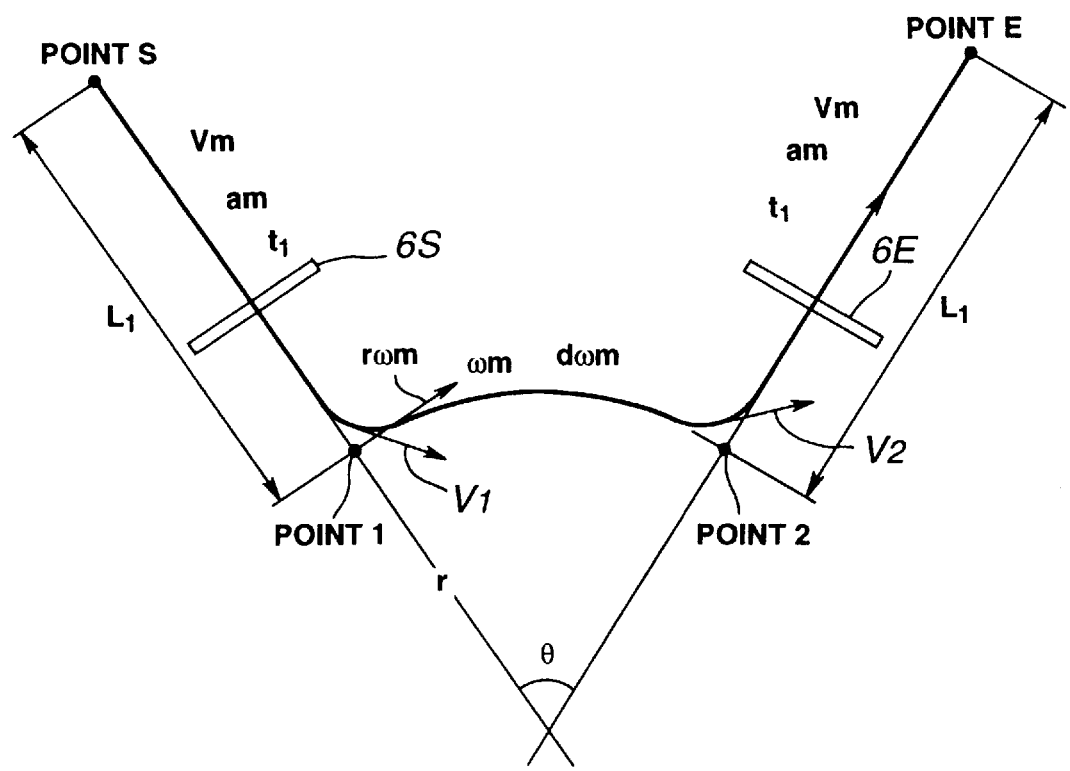
FIG. 4 shows each type of parameter value used during the calculation of a speed pattern according to the first mode of the present invention.

As shown in FIG. 4, wafer movement is considered with a fixed wafer loading position with a certain process chamber being a start point S (corresponds to P1 of FIG. 3) and a fixed wafer loading position with another process chamber being an end point E (corresponds to P4 of FIG. 3). The point 1 is the completion point of the arm retraction by means of robot arms 11, 12 and the point 2 is the completion point of the rotation action. For this case, because the work is made to transfer along a shorter path that combines arm extension/tightening action and rotation action, the start point of the actual rotation is a position slightly closer to the point 1 and the start point of arm extension is a position slightly closer to the point 2.

Furthermore, for this case, the gate valve on the start point S side is 6S and the gate valve on the end point E side is 6E.

Hereupon, the following parameters are set.

vm: Maximum movement speed when expanding/tightening the arms of the robot.

am: Maximum movement acceleration when expanding/tightening the arms of the robot.

t1: Movement time from point S to the point 1 (Movement time from the point 2 to point E)

L1: Distance from point S to the point 1 (Distance from the point 2 to point E)

$\omega$m: Maximum rotation speed of the robot d$\omega$m: Maximum rotation acceleration of the robot V1: Speed of the robot passing the point 1 (more accurately, combined speed of the retraction speed and rotation start speed of the arm at a robot speed during transfer from an arm retraction action to an arm rotation action)

V2: Speed of the robot passing the point 2 (more accurately, combined speed of the extension speed and rotation completion speed of the arm at a robot speed during transfer from an arm rotation action to an arm extension action)

$\theta$: Rotation angle

T: Time required until gate valve 6E on end point E side completely opens after the robot withdraws from the process chamber on start point S side after gate valve 6S in an open state closes (fixed value characteristic to system)

r: Rotation radius

Next, in the following prerequisite conditions during speed control of the first embodiment are shown.

Prerequisite Condition (a)

Movement speed pattern from start point S to end point E is made linearly symmetrical with the center point of the time axis as the center line (see FIG. 8(a), FIG. 9(a), FIG. 10(b)). Therefore, V1 always equals V2.

Prerequisite condition (b)

The robot movement speed is subject to acceleration control such that the opening of gate valve 6E completes when wafer W reaches the point (point P8 in FIG. 3) that corresponds to the point 2.

Prerequisite condition (c)

V1 and V2 are made as large as possible under conditions in which the robot can stop at start point S and end point E in addition to the movement time from the point 1 to the point 2 being longer than time T required to open and close gate valves 6S and 6E.

Prerequisite condition (d)

The movement time from the point 1 to the point 2 are made as small as possible under conditions in which this time is longer than the total time T of the open/close of the above-mentioned gate valves.

Prerequisite condition (e)

Set a limit speed V1t and a limit acceleration alt to prevent the wafer from slipping or dropping from the hand.

In the first embodiment, a movement speed pattern generates that satisfies all of the above-mentioned prerequisite conditions (a) to (d).

In the following, a movement speed pattern lead-through control procedure of the first embodiment that satisfies the above-mentioned prerequisite conditions (a) to (d) will be described.

In robot controller 40, in order to determine movement speed V1(=V2) at point P1 (and the point 2) when a wafer movement command is input from system controller 30 (step 100), at first, the following four values are calculated (step 110) and the smallest value from among these four calculated values is movement speed V1(=V2) at point 1 (and point 2). Moreover, the symbol $\sqrt{(\ )}$ is a substitute symbol that represents an equation within ( ) included in the $\sqrt{}$.

vm $\sqrt{(2am \cdot L1)}$ r·ωm r·vc

Initially, vm is the maximum movement speed when expanding/tightening the arms of the robot and is a value (fixed value) characteristic to the robot. in other words, when vm is selected as V1(=V2), a case is presumed wherein the maximum speed vm is reached before the robot leaves start point S and reaches the point 1.

Next, $\sqrt{(2am \cdot L1)}$ is the maximum acceleration am from start point S to the point 1 and is the speed at the point 1 when acceleration continues. In other words, $\sqrt{(2am \cdot L1)}$ is calculated by means of the following equation (1).

$$V1 = am \cdot t1 = \sqrt{(2am - L1)}$$

The reason for this is as shown below.

$$t1 = \sqrt{(2L1/am)} \tag{1}$$

When this value $\sqrt{(2am \cdot L1)}$ is selected as V1(=V2), after the robot leaves start point S, it will reach the point 1 before reaching maximum speed vm in a state in which it is accelerated by maximum acceleration am.

Next, r·ωm is the maximum rotation angular speed at the point 1. In other words, at the point 1, for example, if an arm retraction speed is selected as speed V1 of the point 1 faster than the maximum rotation angular speed r·ωm even when the retraction speed (for example, vm) of the robot arm can exceed the maximum rotation angular speed r·ωm of the arm, a sudden speed reduction will intensify during a rotation after that. Because of this, when the maximum rotation angular speed r·ωm of the arm is smaller than vm or $\sqrt{(2am \cdot L1)}$, the maximum rotation angular speed r·ωm will be selected as speed V1 of the point 1.

Next, although the equation is r·vc exists, this value vc (angular speed) is presumed for a case when it becomes necessary to change from at least a deceleration action to an acceleration action during a rotation action from the point 1 to the point 2 when the movement distance between process chambers is short (rotation angle θ is small), the movement time from the point 1 to the point 2 is made longer than time T required to open and close gate valves 6S and 6E and V1(=V2) is set to as large a value as possible. A description for vc is provided referring to FIGS. 5(a) and 5(b).

At first, in order to make it possible to set V1(=V2) to as large a value as possible for the change from a deceleration action to an acceleration action during a rotation action, a change from a deceleration action to an acceleration action implements based on the maximum rotation acceleration (=maximum rotation deceleration) dωm as shown in FIG. 5.

Figure 5A:
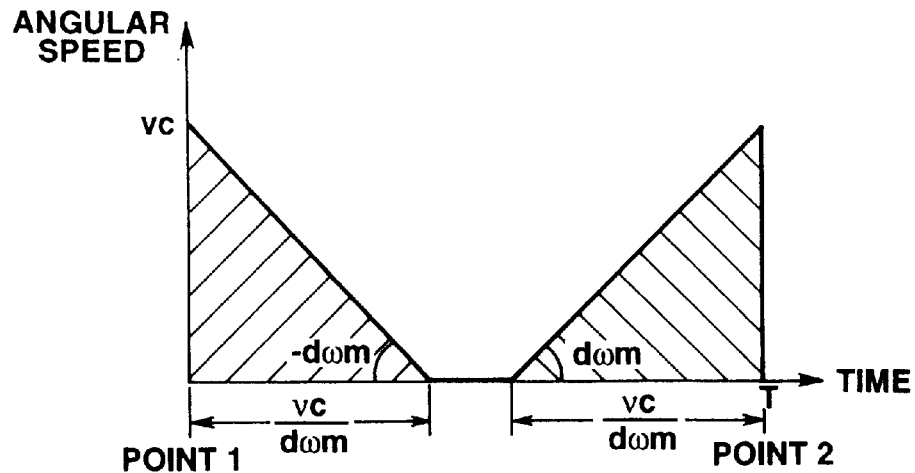
FIGS. 5(a) and 5(b) show one portion of the speed pattern used in the first mode of the present invention.

Hereupon, as shown in FIG. 5(a), when the angular speed of the point 1 (=angular speed of the point 2) is vc, the deceleration time when decelerating to a speed of 0 becomes c/dωm based on the maximum rotation acceleration−dωm and the acceleration time when accelerating to vc also becomes based on the maximum rotation acceleration dωm again from a state of a speed of 0. Furthermore, in FIG. 5(a), the surface area of the hatching portion is equal to rotation angle θ. Therefore, the following equation (2) holds true.

$$vc = \sqrt{(d\omega m \cdot \theta)}$$

$$\text{Because, } 2 \cdot (vc/2) \cdot (vc/d\omega m) = \theta \tag{2}$$

Therefore, the time required to decelerate the speed of the point 1 to a speed of 0 as $vc = \sqrt{(d\omega m \cdot \theta)}$ based on the maximum rotation acceleration−dωm and then immediately thereafter return the speed to the original speed vc from a speed of 0 based on the maximum rotation acceleration dωm again is as follows:

$$2\sqrt{(d\omega m \cdot \theta)}/d\omega m.$$

Therefore, compared to the above-mentioned time T required to open and close gate valves 6S and 6E, when this time $2\sqrt{(d\omega m \cdot \theta)}/d\omega m$ is as follows:

$$T \geq 2\sqrt{(d\omega m \cdot \theta)}/d\omega m,$$

the speed pattern shown in FIG. 5(a) is utilized as the movement speed pattern from the point 1 to the point 2 as $vc = \sqrt{(d\omega m \cdot \theta)}$.

The reason is that the speed pattern shown in FIG. 5(a) executes a rotation speed control that includes a temporary stop such that the movement time from the point 1 to the point 2 coincides with open/close time T while setting V1(=V2) to as large a value as possible.

Figure 5B:
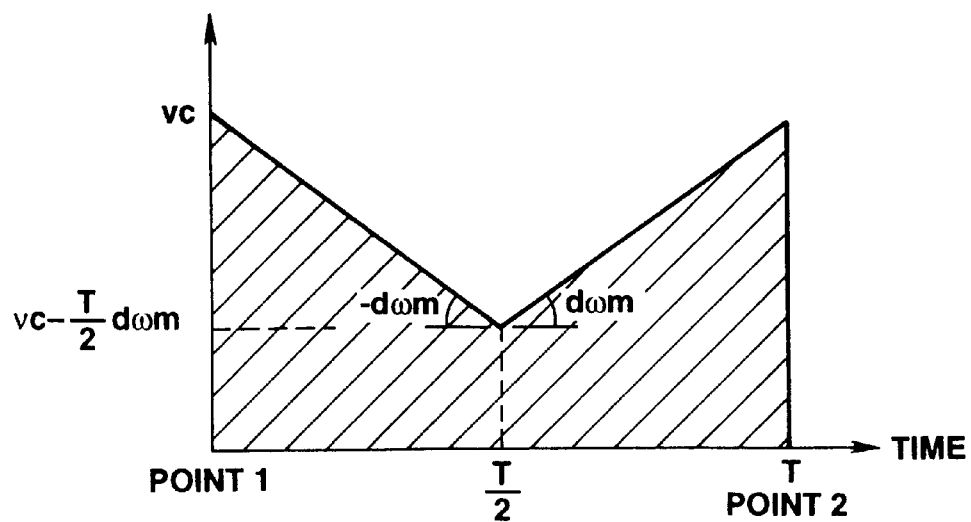

Next, the pattern shown in FIG. 5(b) is utilized as the movement time from the point 1 to the point 2 when $T < 2\sqrt{(d\omega m \cdot \theta)}/d\omega m$.

In other words, in like manner to the speed pattern of FIG. 5(a), the speed pattern of FIG. 5(b) implements a change from a deceleration action to an acceleration action based on the maximum acceleration dωm during a rotation action from the point 1 to the point 2. However, there is a possibility that the rotation time from the point 1 to the point 2 can be made to coincide with the above-mentioned gate valve open/close time T without dropping to a speed of 0. The vc for this case changes as shown below. Furthermore, ( )^2 is a substitute symbol that represents a raising the contents of ( ) to the power of two.

Namely, in FIG. 5(b), the surface area of the hatching portion coincides with rotation angle θ. Therefore, the following equation (2) holds true.

$$\theta = (T \cdot d\omega m/2) \cdot (T/2) + (vc - (T \cdot d\omega m/2)) \cdot T$$

Therefore, $$vc = \{\theta + (T/2)^2 \cdot d\omega m\}/T \quad (3)$$

Figure 1:
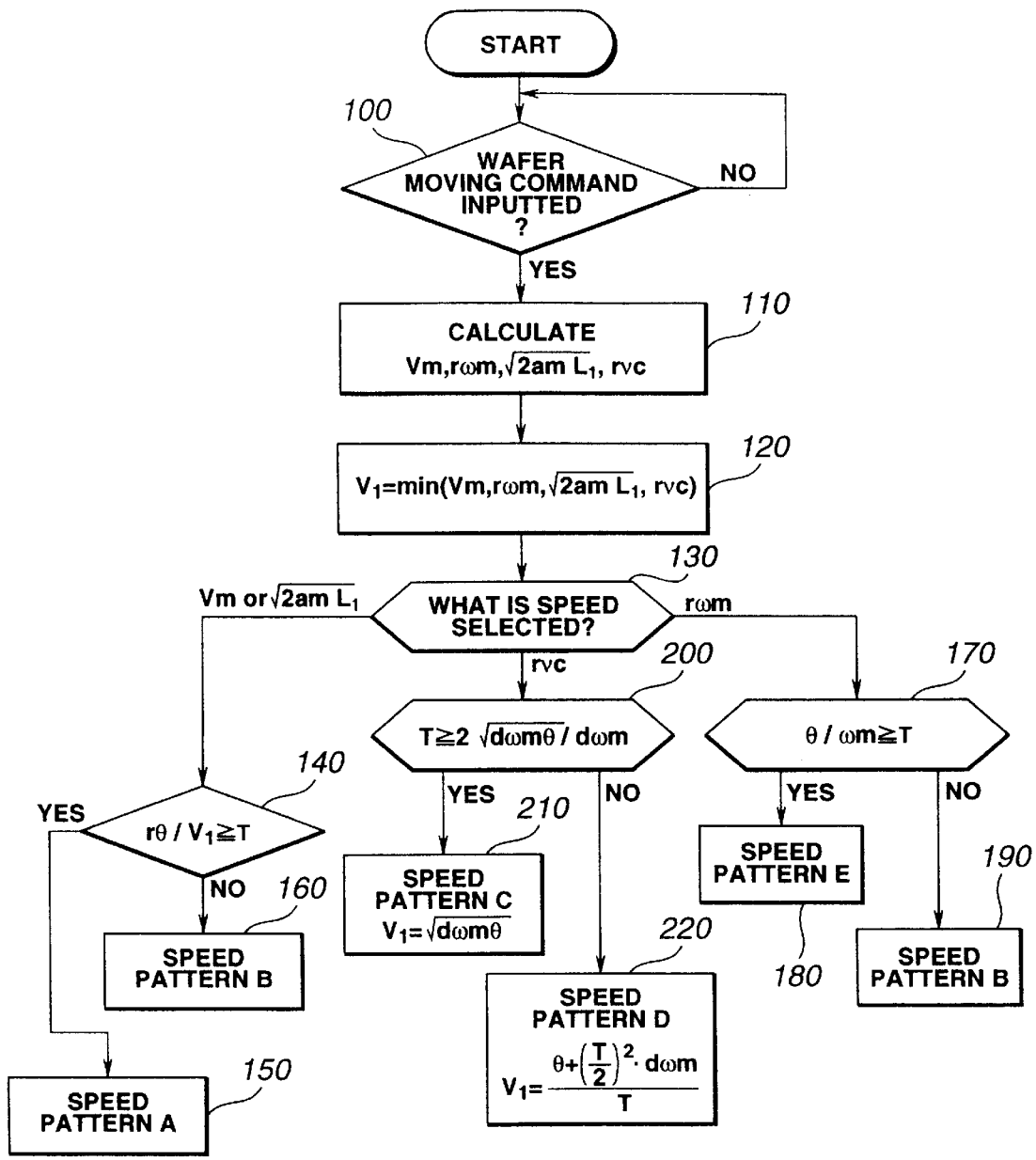
FIG. 1 is a flowchart showing the calculation setting procedure of a speed pattern between the point 1 and the point 2 according to the first mode of the present invention.

In other words, for $T \geq 2\sqrt{(d\omega m \cdot \theta)/d\omega m}$ when calculating vc of step 110 of FIG. 1, $vc = \sqrt{(d\omega m \cdot \theta)}$ is selected and for $T < 2\sqrt{(d\omega m \cdot \theta)/d\omega m}$, $vc = \{\theta + (T/2)^2 \cdot d\omega m\}/T$ is selected.

Next, as previously described in step 120 of FIG. 1, the smallest value from among the above-mentioned four calculated parameters vm, $\sqrt{(2am \cdot L1)}$, rωm, and rvc is determined as speed V1 of the point 1 (=speed V2 of the point 2).

At first, a case when vm or $\sqrt{(2am \cdot L1)}$ are selected from among the four parameters will be described (steps 130, 140).

Figure 6A:
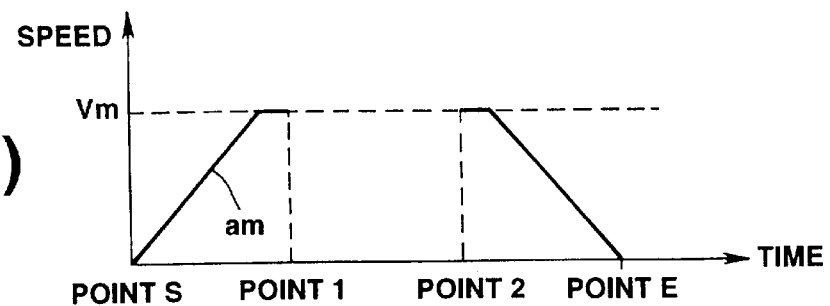
FIGS. 6(a) to 6(d) show examples of each type of a speed pattern from point S to the point 1 and from the point 2 to point E.

When vm is selected, the speed patterns from start point S to the point 1 and from the point 2 to the end point E are normally as shown in FIG. 6(a).

Figure 6B:
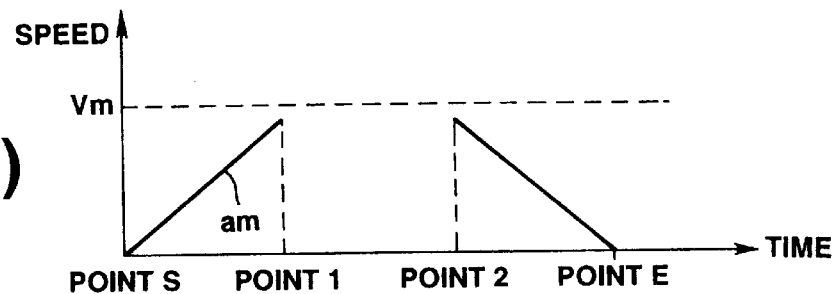

When $\sqrt{(2am \cdot L1)}$ is selected, the speed patterns from start point S to the point 1 and from the point 2 to the end point E are normally as shown in FIG. 6(b). Namely, acceleration occurs based on the arm extension/tightening action from start point S and the point 1 is reached before maximum speed vm is reached.

Next, the rotation action from the point 1 to the point 2 selects an identical speed pattern when either vm or $\sqrt{(2am \cdot L1)}$ is selected.

In other words, in step 130, by selecting vm or $\sqrt{(2am \cdot L1)}$, the maximum rotation speed rωm is larger than these values of V1(=vm, $\sqrt{(2am-L1)}$). Therefore, this means it is possible to accelerate from the V1 value.

Figure 7A:
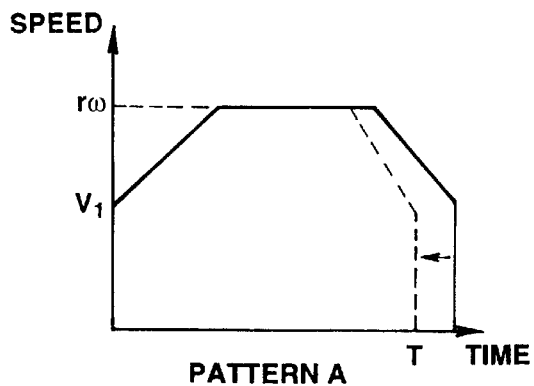
FIGS. 7(a) to 7(e) show speed patterns from the point 1 to the point 2 according to the first mode of the present invention.

Thereupon, in step 140, compared to the above-mentioned gate valve open/close time T, if a fixed time r/V1 when moving a circular arc shaped distance r between the point 1 and the point 2 using value V1 is r/V1≧T, an acceleration pattern A will be utilized as shown in FIG. 7(a) that allows the distance between the point 1 and the point 2 to be larger than T as well as rotate at an time as short as possible (step 150).

Figure 7B:
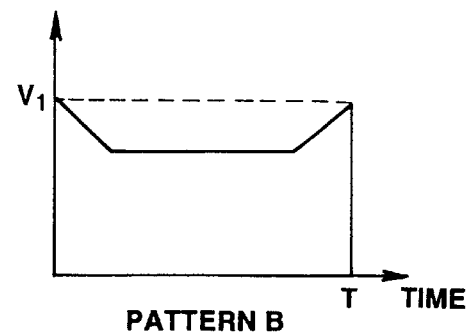

Moreover, if r/V1<T, a deceleration pattern B will be used as shown in FIG. 7(b) that allows movement at a time wherein the distance between the point 1 and the point 2 coincides with the above-mentioned gate valve open/close time T (step 160).

Next, a case when r m is selected from among the four parameters will be described (steps 130, 170).

Figure 6C:
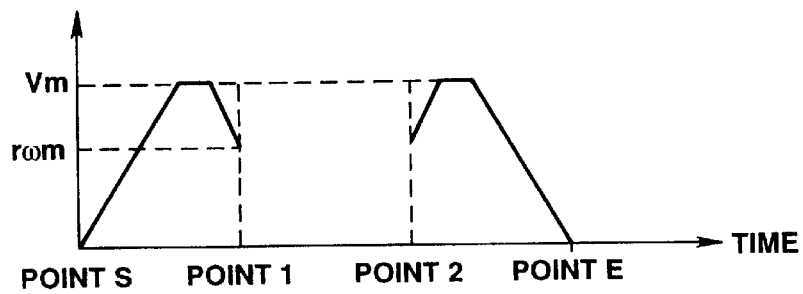

When maximum rotation speed rωm is selected, the speed patterns from start point S to the point 1 and from the point 2 to the end point E are as shown in FIG. 6(c) for example. The speed pattern in FIG. 6(c) is just an example. Generally speaking, for the path from start point S to the point 1, a speed pattern is selected that allows speed rωm to be obtained at the point 1 as well as movement between start point S and the point 1 at the shortest time possible.

Figure 7C:
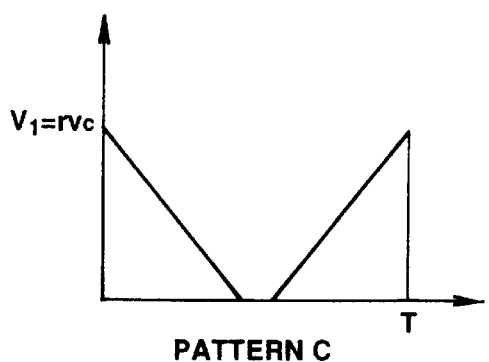
Figure 7D:
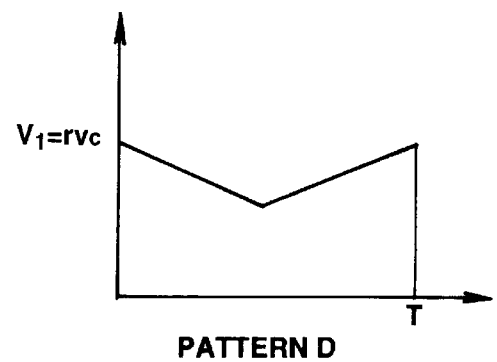
Figure 7E:
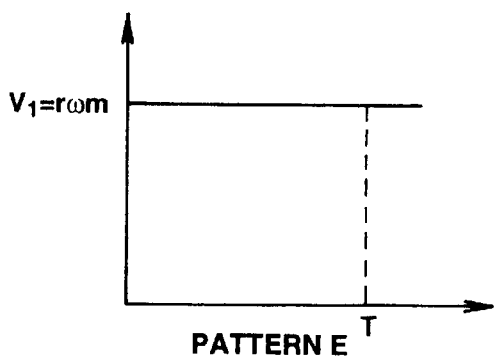

Next, the rotation action from the point 1 to the point 2 when rωm is selected becomes a deceleration pattern B shown in FIG. 7(b) and a constant velocity pattern E shown in FIG. 7(e).

Namely, when rωm is selected, compared to the above-mentioned gate valve open/close time T, if a time θ/ωm when moving a circular arc shaped distance r between the point 1 and the point 2 using value V1 is θ/ωm≧T, a constant velocity pattern E will be utilized as shown in FIG. 7(e) that allows the distance between the point 1 and the point 2 to be larger than T as well as rotate at an time as short as possible (step 180). For this case, because the maximum rotation speed rωm is utilized as V1, acceleration above this is not possible thereby implementing constant velocity control.

Furthermore, if θ/ωm<T, a deceleration pattern B will be used as shown in FIG. 7(b) that allows movement at a time wherein the distance between the point 1 and the point 2 coincides with the above-mentioned gate valve open/close time T (step 190).

Next, a case when r·vc is selected from among the four parameters will be described (steps 130, 200).

Figure 6D:
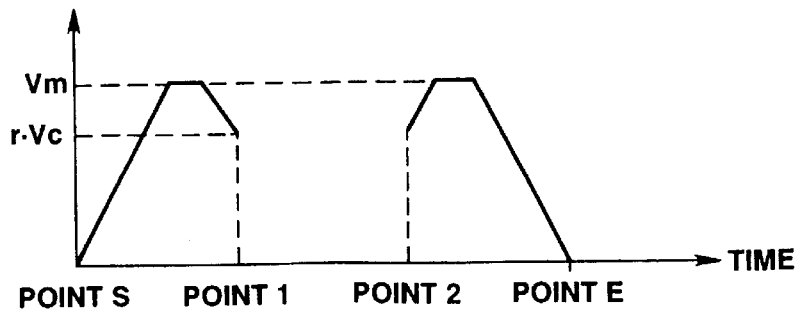

When rvc is selected, the speed patterns from start point S to the point 1 and from the point 2 to the end point E are as shown in FIG. 6(d) for example. The speed pattern in FIG. 6(d) is just an example. Generally speaking, for the path from start point S to the point 1, a speed pattern is selected that allows speed rvc to be obtained at the point 1 as well as movement between start point S and the point 1 at the shortest time possible. Of course, as described above, for the vc value at this time, $vc = \sqrt{(d\omega m \cdot \theta)}$ is selected when $T \geq 2\sqrt{(d\omega m \cdot \theta)/d\omega m}$ and when $T < 2\sqrt{(d\omega m \cdot \theta)/d\omega m}$, $vc = \{\theta + (T/2)^2 \cdot d\omega m\}/T$ is selected.

Next, the rotation action from the point 1 to the point 2 when rvc is selected will be described using FIG. 5. When $T \geq 2\sqrt{(d\omega m \cdot \theta)/d\omega m}$, speed pattern C (=FIG. 5(a)) shown in FIG. 7(c) is selected (steps 200, 210) and when $T < 2\sqrt{(d\omega m \cdot \theta)/d\omega m}$, speed pattern D (=FIG. 5(b)) shown in FIG. 7(d) is selected (steps 200, 220).

If the speed patterns are determined from start point S to end point E in this way, robot controller 40 controls the speed of the robot in accordance with the determined speed patterns.

FIG. 8, FIG. 9 and FIG. 10 show comparative examples of speed patterns according to the above-mentioned first embodiment and speed patterns using conventional technology. Further, in these figures, point P2 and point P3 on each time axis represent the points in FIG. 3.

For FIG. 8, movement stops at point P3 and the opening of gate valve 6d is delayed with conventional technology. However, according to the first embodiment, when point P3 is reached, this coincides with the moment gate valve 6d opens completely and the entire transfer time can also be shortened by only 2ΔT compared to conventional technology.

Further, for FIG. 9 as well, according to the first embodiment, the entire transfer time can also be shortened by only 2ΔT compared to conventional technology.

Even further, for FIG. 10, gate valve 6d opens during robot rotation without any wait time. However, according to the first embodiment, the wafer transfer time can be shortened even more than conventional technology by only 2ΔT+α. Moreover, α is the time that passes until reaching end point P4 utilizing conventional technology after opening gate valve 6d.

In the first embodiment, the movement speed pattern from start point S to end point E is made to be symmetrical with the center point of the time axis as the center line although in the present invention this is not a limitation. Namely, V1 need not equal V2.

Next, the second embodiment of the present invention will be described referring to FIG. 11.

When the point 2 of FIG. 11 is reached (in actuality, the movement does not pass over the point 2 therefore this refers to the point on the movement path (shortest path) that corresponds to the time when the point 2 should be passed ), the open/close state of gate valve 6E on the transfer destination side is checked. When gate valve 6E is closed, the movement stops at a fixed stop position Q in front of gate valve 6E and when gate valve 6E is open, the transfer continues without change up to end point position E without stopping at stop position Q. Because of this, in the second embodiment, a speed n of the point 1, the transfer speed between the point 1 and the point 2, and speed u of the point 2 are set to allow the movement from the point 2 to stop at point Q by means of the deceleration control. In the second embodiment however, since the open/close state of gate valve 6E is checked at the point 2, there is no setting of the speed pattern such that the rotation speed from the point 1 to the point 2 becomes longer than time T always required to open and close gate valves 6S and 6E.

At first, in order to allow the movement to stop at point Q, the conditions of speed u of the point 2 satisfy the following equation (4).

$$u \leq \sqrt{(L3/L1)} \cdot \sqrt{(2am \cdot L1)} \tag{4}$$

In other words, $\sqrt{(2am \cdot L1)}$ is the speed when acceleration continues at a distance of only L1 at a maximum movement speed am during arm extension/tightening from a speed of 0. By means of proportionally distributing this using $\sqrt{(L3/L1)}$, an upper limit speed u of the point 2 to allow the movement to stop at point Q can be found.

Even further, if deceleration occurs between the point 1 and the point 2 based on the maximum rotation acceleration dωm, speed n at the point 1 will vary from the following equations (5) and (6). In the equations, r ^2 is r raised to the power of two and u ^2 is u raised to the power of two.

$$((n+u)/2) - ((n-u)/(r \cdot d\omega m)) = \theta \tag{5}$$

$$n = \sqrt{(2r \char`\^ 2 \cdot \theta \cdot d\omega m + u \char`\^ 2)} \tag{6}$$

Namely, in the second embodiment, the final speed V1 at the point 1 is determined in accordance with the equation min (vm,√(2am·L1), rωm, n)

wherein rvc of the selection condition equation "min (vm, √(2am·L1), rωm, rvc)" indicated in step 120 of FIG. 1 of the first embodiment is replaced by n. The final speed at the point 2 is the above-mentioned upper limit speed u.

Therefore, when n is selected as V1, the rotation speed pattern from the point 1 to the point 2 is as shown in FIG. 12(a). When a value other than n is selected as V1, the rotation speed pattern from the point 1 to the point 2 is as shown in FIG. 12(b).

The movement from start point S to the point 1 in the second embodiment is also similar to the first embodiment. This movement speed pattern is determined to realize speed V1 at the point 1 as well as allow the point 1 to be reached as fast as possible.

Thus, in the second embodiment, when the gate valve of the transfer destination process chamber is detected to be open, the robot at the point 2 can be moved using a high speed pattern with the shortest transfer time from among the speed patterns that allow a stop at fixed end point Q in front of the transfer destination process chamber.

Moreover, it is preferable for end point Q to be a position as close as possible to gate E of the transfer destination process chamber. However, if it is a position on the movement path before the work reaches gate E of the transfer destination process chamber, that position can be randomly set. Further, if the position to confirm that gate E is open is closer to stop position Q, it is a random position not limited to the position corresponding to the point 2.

Next, the third embodiment of the present invention will be described.

In the second embodiment, there is no setting of the speed pattern such that the rotation speed from the point 1 to the point 2 becomes longer than time T always required to open and close gate valves 6S and 6E. However, in the third embodiment, the setting of the speed pattern is such that the rotation speed from the point 1 to the point 2 becomes longer than time T always required to open and close gate valves 6S and 6E in addition to making that rotation time as short as possible. This point is the difference between the third embodiment and the second embodiment.

Namely, in the third embodiment, although the final speed V1 at the point 1 is determined in accordance with the equation "min (vm,√(2am·L1), rωm, n)", the contents of the above-mentioned n are different from the second embodiment.

Namely, in the third embodiment, although speed n of the point 1, the movement speed between the point 1 and the point 2, and speed u of the point 2 are set to allow the movement to stop at point Q by means of the deceleration control, to make the rotation speed from the point 1 to the point 2 longer than time T always required to open and close gate valves 6S and 6E and even further to make the rotation time as short as possible, in order to make allowance for time T, the value N is made a value different from the other four values. Further, speed u of the point 2 is not one type of value.

In the following, the third embodiment will be described referring to FIG. 11.

In order to stop at point Q in the third embodiment, speed u of the point 2 can be found from the following equation of the above-mentioned (4).

$$u = \sqrt{(L3/L1)} \cdot \sqrt{(2am \cdot L1)} = U \tag{7}$$

The value u determined by this equation is U.

In like manner, if deceleration occurs between the point 1 and the point 2 based on the maximum rotation speed d m of the robot, speed n at the point 1 can be found from the following equation (6).

$$n = \sqrt{(2r \char`\^ 2 \cdot \theta \cdot d\omega m + u \char`\^ 2)} = N \tag{8}$$

The value n determined by this equation is N.

Hereupon, when the speed of the point 1 is N and the speed of the point 2 is U, the time to rotate is $(N-U)/(r \cdot d\omega m)$ based on the maximum rotation speed–dωm of the robot. Therefore, when $T \leq (N-U)/(r \cdot d\omega)$, n=N and u=U. The rotation speed pattern from the point 1 to the point 2 is as shown in FIG. 13(a).

However, when $T > (N-U)/(r \cdot d\omega)$, one pattern from among the patterns shown in FIG. 13(b) to FIG. 13(e) is selected as the rotation speed pattern from the point 1 to the point 2.

Hereupon, as shown in FIG. 14, if speed N0 at the point 1 is found such that at the moment the speed reaches 0 decelerating at a maximum acceleration of $-r \cdot d\omega m$, acceleration will occur at a maximum acceleration of $r \cdot d\omega m$ and then the movement distance (rotation distance) will become equal to $r \cdot \theta$ until the speed after that acceleration is equal to U, then the relationship shown below will result in equation (9) shown below as well.

$$(N0/2) \cdot (N0/(r \cdot d\omega m)) + (U/2) \cdot U/(r \cdot d\omega m)) = r \cdot \theta$$

$$N0 = \sqrt{(2 \cdot r \char`\^ 2 \cdot \theta \cdot d\omega m - U \char`\^ 2)} \tag{9}$$

Next, when $T > (N-U)/(r \cdot d\omega)$, at first, speed n1 will be found such that the surface areas of two different hatching portions become equal as shown in FIG. 13(b).

In other words, when T>(N−U)/(r·dω), the overall speed drops from the speed pattern shown in FIG. 13(a) making it necessary for the rotation time from the point 1 to the point 2 (distance=r·θ) to coincide with T. Therefore, for this case, after the speed at the point 1 drops with changing deceleration/acceleration−dωm and fixed time t1 elapses, a speed reduction will be achieved by means of accelerating again based on acceleration dam.

Initially, $$n1 - r \cdot d\omega m \cdot t1 + r \cdot d\omega m \cdot (T-t1) = U$$

From this equation is obtained the following equation.

$$t1 = (1/2) \cdot \{((n1-U)/(r \cdot d\omega m)) + T\} \tag{10}$$

Furthermore, from this surface are the following equation holds true.

$$n1 \cdot t1 - (1/2) \cdot r \cdot d\omega m \cdot t1^2 + U(T-t1) - (1/2) \cdot r \cdot d\omega m \cdot (T-t1)^2 = r \cdot \theta$$

Therefore, the following equation (11) holds true.

$$(n1-U)t1 + U \cdot T - (1/2) \cdot r \cdot d\omega m \cdot (T^2 - 2Tt1 + 2t^2) = r \cdot \theta \tag{11}$$

The value n1 is calculated by the two equations (10) and (11) above.

Next, the value n1 calculated in this manner is compared to N0 found in accordance with FIG. 14. Then based on this comparison result, one pattern from among the patterns shown in FIG. 13(b) to FIG. 13(e) is selected.

Namely, when n1≧N0, n=n1 or u=U and the rotation speed from the point 1 to the point 2 is as shown in FIG. 13(b).

Furthermore, when n1<N0, the speed pattern that is selected differs with N0 either being larger or smaller than U.

In other words, with n1<N0 for a case when N0>U, the rotation speed pattern from the point 1 to the point 2 is as shown in FIG. 13(c) with n=N0 or u=U.

As Even further, with n1<N0 for a case when N0<U, the rotation speed pattern from the point 1 to the point 2 is selected from either the pattern of FIG. 13(d) or FIG. 13(e). At that time, the values for n and u are chosen such that the speed patterns shown in FIG. 13(d) and FIG. 13(e) hold true.

In other words, the reason N0<U is because speed n of the point 1 is made to be slower than speed u of the point 2. This departs from the principle that the withdrawal from start point S to the point 1 is made to occur as fast as possible and because of this, speed u at the point 2 is made to be smaller than U which in turn makes speed n at the point 1 as large as possible.

Hereupon, the calculation to find n and u as n=u for FIG. 13(d) or FIG. 13(e) will be simplified.

In the example of FIG. 13(d) the following equation holds true.

$$n \cdot T - (1/2) \cdot T \cdot (r \cdot d\omega m \cdot (1/2)) = r \cdot \theta$$

Because of this, the equation is as follows.

$$n = u = (r\theta/T) + (r \cdot d\omega m \cdot T \cdot (1/4)) \tag{12}$$

Further, in the example of FIG. 13(e) the following equation holds true.

$$n \cdot (n/(r \cdot d\omega m)) = r \cdot \theta$$

Because of this, the equation is as follows.

$$n = u = r\sqrt{(d\omega m \cdot \theta)}$$

In addition, in the speed patterns shown in FIG. 13(d) or FIG. 13(e), n=u. However, an optimum n and u can be determined that hold true for n>u.

Thus, in the third embodiment, in contrast to the second embodiment, conditions are added wherein when the robot reaches the point 2, the opening of the transfer destination gate means completes in addition to the transfer time from the point 1 to the point 2 becoming the shortest time longer than time T required to open and close the gate valves of the transfer origin process chamber and the transfer destination process chamber to set and calculate the transfer speed pattern. Because of this, for a case other than when an abnormality occurs, the robot can achieve an even more efficient work carrying action without stopping in transit.

Next, the fourth embodiment of the present invention will be described referring to FIG. 15.

The fourth embodiment has one additional function in comparison to the second embodiment or the third embodiment.

As shown in FIG. 15(a) and FIG. 15(b), in this additional function, if deceleration is occurring when the open/close state of gate valve 6E is successively checked and gate valve 6E is confirmed to be open during movement from the point 1 to the point 2, the deceleration action at that moment will stop and an acceleration action will execute immediately at maximum acceleration dim. However, when the speed reaches the limit value V1t of the allowable speed during the acceleration action, that limit speed V1t will be maintained.

The limit speed V1t for this case is the minimum value within vm, rωm, √(2am·L1) as in the equation shown below.

$$\min(vm, r\omega m, \sqrt{(2am \cdot L1)})$$

Further, the reason parameters vm and √(2am·L1) related to the arm extension/tightening speed are input in this equation is that if vm or √(2am·L1) are exceeded at the point 2 (end point of rotation action), it will become impossible to stop the movement at end point E.

In the fourth embodiment, if deceleration is occurring when gate valve 6E can be confirmed to be open during the movement from the point 1 to the point 2, the deceleration action at that moment will stop and an acceleration action will execute immediately at maximum acceleration dωm. Therefore, wafer carrying becomes possible at an even shorter transfer time.

In the fourth embodiment as well, the start of the confirmation of the open state of gate valve 6E of the transfer destination process chamber is arbitrary if it occurs after the work passes through gate valve 6S of the transfer origin process chamber.

Next, the fifth embodiment of the present invention will be described referring to FIG. 18.

In the fifth embodiment, the rotation path is set at a position close to gates 6S and 6E. Because of this, when an arm extension action executes towards gate 6E from close to the point 2, the work will protrude toward gate 6E when gate 6E is closed.

Therefore, in the fifth embodiment after the work reaches fixed position Qc on the rotation path the confirmation of the open state of gate valve 6E of the transfer destination process chamber starts. When gate valve 6E is confirmed to be open, the arm extension action executes towards gate 6E. For this case, the point 2 where the rotation path of the work and the arm extension path intersect is set as the work stop point. Therefore, when gate 6E does not open until the work reaches the point 2, the work will momentarily stop at the point 2 and after gate 6E opens, the arm extension action executes towards gate 6E.

Figure 18:
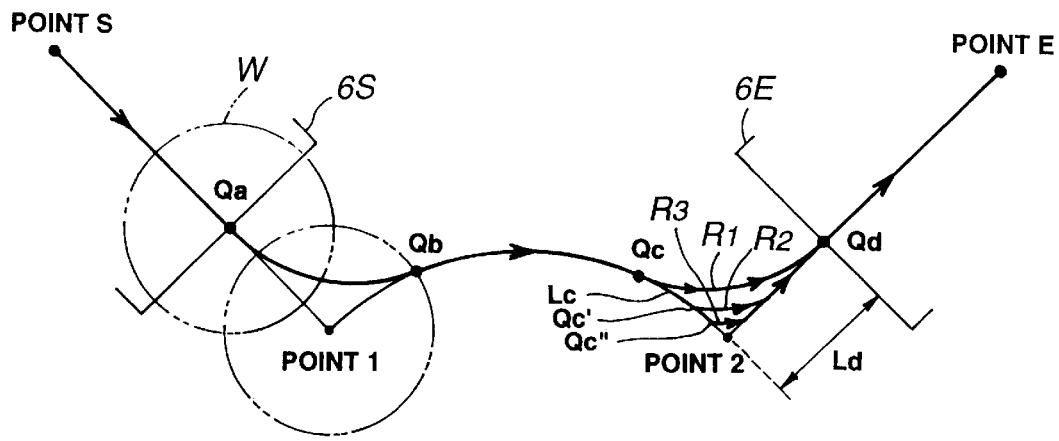
FIG. 18 shows the work transfer path according to the fifth mode.

Furthermore, in the fifth embodiment, a short path is actively used during the movement around the point 1 and the point 2 and the work transfer distance is made as short as possible to shorten the work transfer time as shown in FIG. 18.

Figure 19:
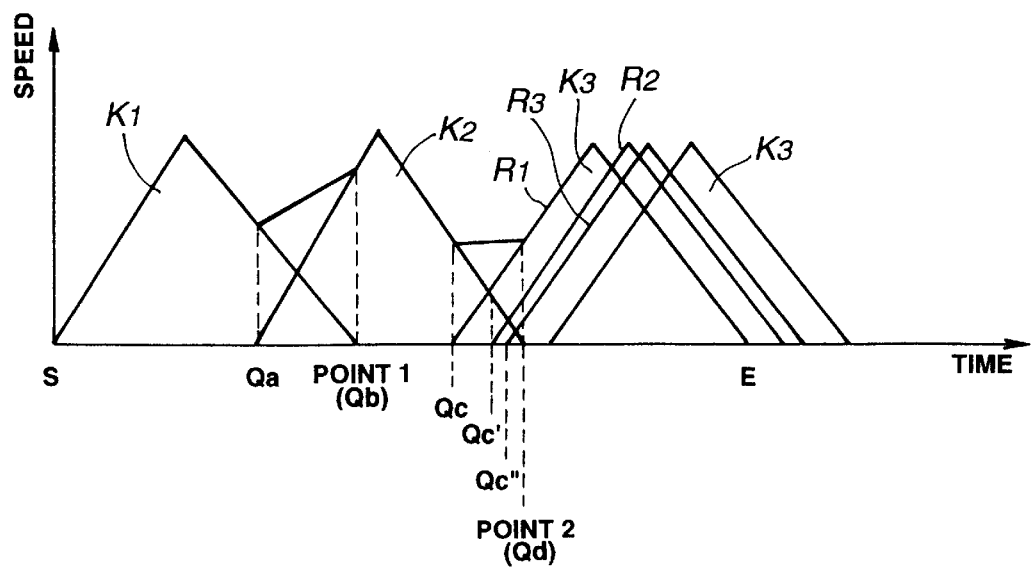
FIG. 19 shows an example of a speed pattern according to the fifth mode.

As shown in FIG. 19 as well, the following speed patterns are prepared in advance in this embodiment. A first speed pattern K1 related to the arm retraction action to transfer the work in the centripetal direction from start point S to the point 1 (point Qb) and then stop the work. A second speed pattern K2 that accelerates and rotates the work stopped from the first position and then stops the work at the point 2. A third speed pattern K3 related to the arm extension action to transfer the work in the centrifugal direction from the point 2 (point Qc) to end point E and then stop the work. By means of overlapping (merging) these speed patterns, a speed pattern that extends from start point S to end point E is generated. The speed pattern shown in FIG. 19 is just an example.

For this case, the position where the first speed pattern and the second speed pattern is fixed and is the position at the moment when the center of the work reaches position Qa of gate 6S. In contrast, the merging position between the second speed pattern and the third speed pattern is not fixed and is the position where gate 6E is confirmed to be open at the position between from point Qc on the rotation path to the point 2.

Moreover, because the stop point is set at the point 2 for this case, the first and second speed patterns are set to speed patterns which allow the transfer between start point S and end point E to occur at the shortest time as conditions that make it possible to stop at the point 2, to not exceed the limit speed of the arm extension/tightening and rotation action, and to not exceed the limit speed V1t and the limit speed a1t of the system. In addition, the third speed pattern is a pattern identical to the first speed pattern.

The position of point Qc for this case is set as follows.

Namely, if the maximum acceleration of the arm retraction action is am, the maximum acceleration of the rotation action is dωm, the distance between the point 2 and point Qd is Ld, and the distance between the point 2 and point Qc is Lc, then time T required to move from the point 2 to point Qd at the maximum acceleration is the equation shown below.

$$T=\sqrt{(2 \cdot Ld/am)}$$

Therefore, based on the maximum rotation acceleration dωm in the opposite direction, distance Lc that allows the rotation path to rotate from the point 2 during time T is set as a distance on a circular arc from the point 2 of point Qc.

In other words, $$Lc=(Ld \cdot d\omega m)/am$$

Figure 20:
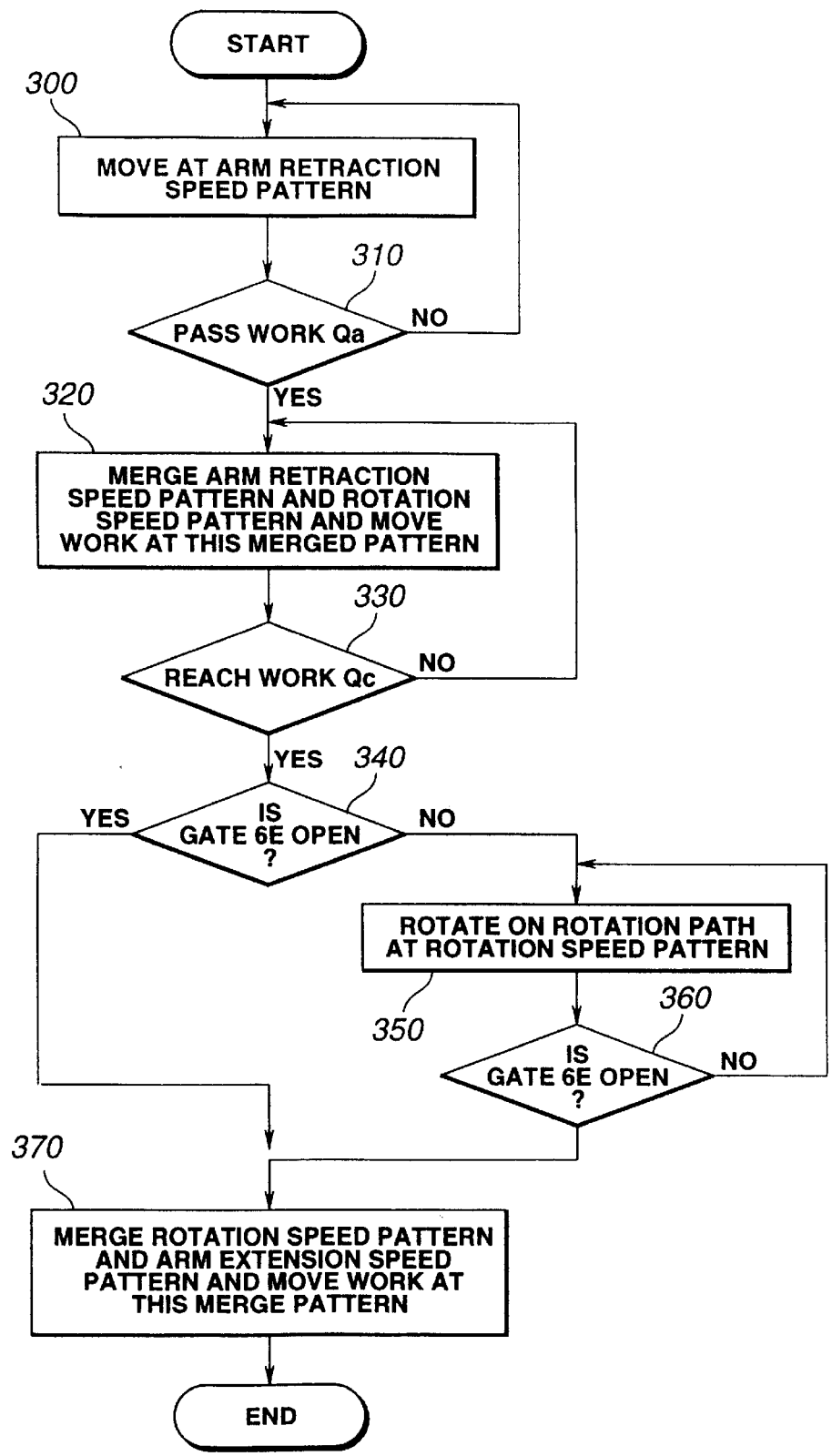
FIG. 20 is a flowchart showing the wafer carrying action of the fifth mode.

Next, the operation of the fifth embodiment will be described referring to the flowchart of FIG. 20.

When a wafer transfer command is input, robot controller 40 reads from a memory (not shown in the figure) a speed pattern that corresponds to the transfer origin and transfer destination process chamber numbers and then executes a withdrawal action in accordance with the speed pattern read from the memory (step 300). Then, normally, the first and third speed patterns K1 and K3 which correspond to the arm extension/tightening action are common and not related to the transfer origin and transfer destination process chamber numbers. The second speed pattern K2 related to the rotation action differs in proportion to the transfer origin and transfer destination process chamber numbers. Further, for this case as well, the first and third speed patterns K1 and K3 are common.

Next, after the work movement starts, when robot controller 40 detects that the fixed time required to pass the work through fixed point Qa that corresponds to the position of gate 6S has elapsed (step 310), the second speed pattern K2 related to the rotation action merges with the first speed pattern K1 related to the arm retraction action and then by means of driving the robot in accordance with this merged speed pattern, the point work transfers along the short path from point Qa toward point Qb and then is rotated between point Qb and point Qc (step 320).

Next, when robot controller 40 detects that the fixed time required to pass the work through the position of point Qc has elapsed (step 330), a confirmation action of the open state of the gate is made from the output of the gate valve open/close sensor of the gate of the transfer destination process chamber (step 340). If an open state of the gate is confirmed at this time, the third speed pattern K3 related to the arm extension action merges with the second speed pattern K2 related to the rotation action at this time and then by means of driving the robot in accordance with this merged speed pattern, the point work transfers along the short path from point Qc toward point Qd and then is driven linearly between point Qd and end point E (step 370). For this case, the work transfers on route R1 of FIG. 18.

In contrast, if an open state of the gate of the transfer destination process chamber cannot be confirmed when the work reaches point Qc, the rotation action will continue without any changes in accordance with the second speed pattern. Moreover, the open state of the gate is always confirmed in parallel with the rotation action based on the output of the gate valve open/close sensor of the gate of the transfer destination process chamber (steps 350, 360). At the moment when the gate can be confirmed to be open, the third speed pattern K3 related to the arm extension action merges with the second speed pattern K2 related to the rotation action and the robot is driven in accordance with this merged speed pattern (step 370).

Therefore, at the moment the open state of the gate is confirmed, the work is transferred along route R2 of FIG. 18 at Qc' of FIG. 19. Further, at the moment the open state of the gate is confirmed, the work is transferred along route R3 of FIG. 18 at Qc'' of FIG. 19. Even further, at the moment when the gate can be confirmed to be open after the work stops at the point 2 in accordance with the rotation speed pattern, the work rotates until the point 2 and then after momentarily stopping here, is driven linearly from the point 2 toward end point E.

Thus, in the fifth embodiment, at the moment when the gate of the transfer destination process chamber is confirmed to be open, the speed pattern of the rotation action and the speed pattern of the arm extension action merge. Then, by means of controlling the speed using this merged speed pattern, protrusion of the work toward the gate means can be avoided without stopping the work at the point 2 as much as possible. Therefore, along with making it possible to reduce the probability that the work must actually stop, it also becomes possible to execute an acceleration action toward the transfer destination process chamber not only from a state in which the robot is completely stopped with a speed of 0 but also in a state that has this approximate speed.

Furthermore, in the fifth embodiment, because the protrusion toward the gate means is controlled by means of the merging of the speed patterns, speed patterns previously held for one path are improved using three speed patterns thereby conserving memory capacity in addition to simplifying the control structure.

Even further, the position where the first speed pattern and the second speed pattern merge is not limited to point Qa. If it a position between point Qa and the point 1, the position can be set arbitrarily. Also, the position where the second speed pattern and the third speed pattern merge is not limited to point Qc determined by distance Lc found by the above-mentioned conditional equation but is arbitrary as well.

In this embodiment, as a method to judge whether the work passed point Qa and point Qc, whether a fixed time required for the work to pass these points has elapsed is detected. However, the work position can be directly found and a judgment made on whether it passed these points.

In the fifth embodiment it is preferable for the stop point to be set to the point 2. However, an arbitrary point on the rotation path can be set as the stop point.

Even further, the concept of the fifth embodiment can be applied to the second embodiment or the third embodiment.

Next, the sixth embodiment of the present invention will be described referring to FIG. 21.

As in the fifth embodiment, the following speed patterns are set in advance for each transfer path (different transfer distance for each) without generating a speed pattern of the work transfer path by means of merging the arm extension/tightening action and the rotation action. A normal standard path movement speed pattern, a withdrawal path speed pattern to prevent the work from protruding into the gate of the transfer destination process chamber, and a return path speed pattern to return the work from the withdrawal path the to the standard path. When the work is protruding into the gate of the transfer destination process chamber, the work is allowed to transfer on another path different from the standard path by means of transferring the withdrawal path and the return path.

Figure 21:
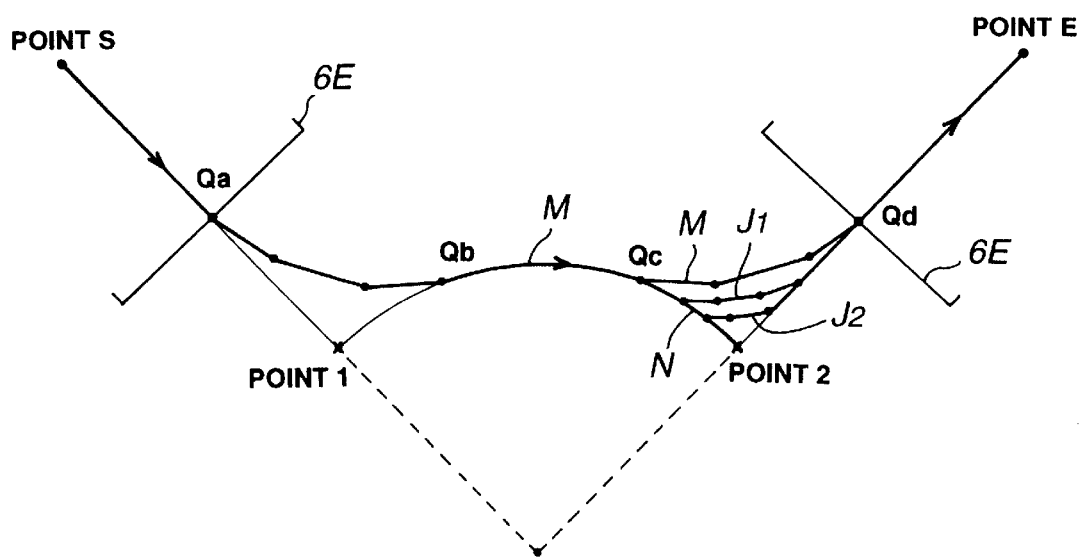
FIG. 21 shows the work transfer path according to the sixth mode.

For this case, as shown in FIG. 21, the two short paths on the standard path comprise a path obtained by a pseudo circular arc interpolation using a straight line.

Namely, in the sixth embodiment, standard path M is a path that connects start point S→point Qb→point Qc→point Qd→end point E and withdrawal path N is a path that extends from point Qc to the second stop point. The return path is a path that returns J1, J2 the work from the withdrawal path to the standard path.

In other words, in like manner to the fifth embodiment, when the confirmation of the open state of gate valve 6E of the transfer destination process chamber starts and the open state of gate valve 6E can be confirmed to be open at point Qc in the sixth embodiment, the work is transferred along the normal standard path M. When the open state of gate valve 6E cannot be confirmed to be open at point Qc, the work is transferred on the previously set return path N. Then, at the moment when the open state of gate valve 6E can be confirmed to be open during the transfer on this return path N, the previously set return path that corresponds to the position that can be confirmed is selected and the work is transferred along the selected return path. When the open state of gate valve 6E can be confirmed after the work stops at the second stop point, the work is transferred up to the second stop point and after it stops here momentarily, is transferred in a straight line towards end point E.

The transfer action of the sixth embodiment is effectively identical to the fifth embodiment although the means to control the speed that implements this transfer action is different.

Thus, in the sixth embodiment, the work is prevented from protruding toward the gate means without stopping the work at the stop point as much as possible. Therefore, along with making it possible to reduce the probability that the work must actually stop, it also becomes possible to execute an acceleration action toward the transfer destination process chamber not only from a state in which the robot is completely stopped with a speed of 0 but also in a state that has this approximate speed making it possible to achieve even more efficient wafer carrying.

Moreover, position Qc where the confirmation of the open state of the transfer destination process chamber and the second stop point can be set to other arbitrary positions.

Even further, although the wafer is loaded onto the hand in each of the above-mentioned embodiments, an air vacuum suction plate can be used to support the wafer as well.

Even further, although a frog-leg type robot is used in each of the above-mentioned embodiments, another type of multi-joint robot can also be used. Even further, although wafer carrying is implemented utilizing the rotation action of the robot between the point 1 and the point 2 in each of the above-mentioned embodiments, wafer carrying between the point 1 and the point 2 can be implemented utilizing arm movement.

Even further, although the present invention is applied to a manufacturing apparatus that processes wafers in the above-mentioned embodiments, it can be adapted to other manufacturing apparatuses that produce other work such as LCDs (liquid crystal display elements).

Even further, although the present invention applies to a system wherein process chambers are disposed around a transfer chamber in the above-mentioned embodiments, the invention can be adapted to a system wherein a plurality of process chambers are disposed side-by-side adjacent to the transfer chamber.

INDUSTRIAL APPLICABILITY

The present invention is useful when applied to a multi-chamber type processing apparatus that carries a work such as a wafer or an LCD from a certain process chamber to another process chamber by means of a work carrying robot wherein a plurality of process chambers are disposed around one transfer chamber.

What is claimed is:

1. In a work carrying system comprising:

a work processing device having a transfer chamber to which a work carrying robot is disposed, a plurality of process chambers disposed adjacent to the transfer chamber which implement various types of processes on a work, and a plurality of gate means each being disposed between each of the process chambers and the transfer chamber, for performing closing and opening actions;

the work carrying robot being adopted to transfer the work positioned at a transfer origin process chamber among the plurality of process chambers to a transfer destination process chamber along a predetermined movement path through the gate means of the transfer origin process chamber, the transfer chamber and the gate means of the transfer destination process chamber, wherein a specified time is required to open from a closed state of the gate means of the transfer origin process chamber and of the transfer destination process chamber during the transfer, characterized by:

a control device for the work carrying robot, comprising:

point setting means which sets a first point where the work on the movement path shifts from a moving action from the transfer origin process chamber to the transfer chamber to a moving action inside the transfer chamber and a second point where the work shifts from the moving action inside the transfer chamber to a moving action from the transfer chamber to the transfer destination process chamber;

gate open and close means for terminating the opening action of the gate means at the transfer destination side at a moment when the work has reached the second point on the movement path on the basis of a transfer distance of the work and a time required to open the gate means from the closed state;

moving speed pattern setting means for allowing the work carrying robot not to stop until the work reaches from the first point to the second point, and setting the transfer time of the work from the first point to the second point to be a minimum time and less than the time required to open the gate means from the closed state; and moving speed control means for controlling the moving speed of the work carrying robot in accordance with a moving speed pattern set by the moving speed pattern setting means.

2. The control device for a work carrying robot according to claim 1, characterized in that the speed control means sets the speed pattern on the movement path such that the movement speed between the first point and the second point becomes a maximum value with a range that does not exceed a limit speed of the robot and a restriction speed of the system.

3. The control device for a work carrying system according to claim 1, characterized in that a predetermined stop point is further set that allows the work to stop in front of the gate means of the transfer destination process chamber on the movement path;

the work processing device further comprises gate detection sensors each detects an open and close state of each of the plurality of gate means;

the speed control means sets the speed pattern on the movement path such that the movement speed at the second point allows the work to stop at the stop point and the movement speed at the first point is decreased to the movement speed at the second point and controls the speed of the work carrying robot in accordance with the set speed pattern;

the control device further comprises:

judgment means that judges open and close state of the gate means of the transfer destination process chamber at a time point when the robot reaches the second point by an output of the gate sensor of the transfer destination process chamber; and stop control means that controls the speed of the robot such that, when the opening of the gate means of the transfer destination process chamber is confirmed by the judgment means, the stop control means does not stop the robot at the stop point but transfers to the transfer destination process chamber and, when the closing of the gate means of the transfer destination process chamber is confirmed by the judgment means, the stop control means stops the robot at the stop point.

4. The control device for a work carrying system according to claim 3 further comprising:

second judgment means that judges the open and close state of the gate means of the transfer destination process chamber by the output of the gate sensor of the transfer destination process chamber after the work passed the first point; and switching control means that immediately stops deceleration and executes an acceleration action if the gate means of the transfer destination process chamber is judged by the second judgment means to be open before the work reaches the second point when the deceleration action is executed at the time of the judgment.

5. The control device for a work carrying system according to claim 4, characterized in that the acceleration action implemented by the switching control means is carried in such a manner as to not exceed a limit speed of the robot and a restriction speed of the system.

6. In a work carrying system comprising:

a work processing device having a transfer chamber to which a work carrying robot is disposed, a plurality of process chambers disposed adjacent to the transfer chamber which implement various types of processes on a work, a plurality of gate means each being disposed between each of the process chambers and the transfer chamber, for performing opening and closing actions, and a plurality of gate open and close sensors each for detecting an open or closed state of each of the plurality of gate means;

the work carrying robot being adopted to transfer the work positioned at a transfer origin process chamber among the plurality of process chambers to a transfer destination process chamber along a predetermined movement path through the gate means of the transfer origin process chamber, the transfer chamber and the gate means of the transfer destination process chamber, wherein a specified time is required to open from a close state of the gate means of the transfer origin process chamber and of the transfer destination process chamber during the transfer, characterized by:

a control device for the work carrying system, which previously sets a confirmation start point for starting confirmation of the open and closed state of the gate means of the transfer destination process chamber at a front position where the work makes contact with the gate means of the transfer destination process chamber on the movement path and previously sets a predetermined withdrawal path different from the movement path as a start point of the confirmation start point; and which comprises:

open and close judgement means that starts judgement of the open and closed state of the gate means of the transfer destination process chamber based on the output of the gate open and close sensor from moment the robot passes the confirmation start point; and speed control means that moves that work to the transfer destination process chamber on the movement path when the open and close judgement means confirms the opening of the gate means of the transfer destination process chamber at a moment when the work passes the confirmation start point, selects the withdrawal path and moves the work when the opening of the gate means of the transfer destination process chamber is not confirmed by the open and close judgement means at the moment when the work passes the confirmation start point, and controls a speed of the work carrying robot such that the work is allowed to return to the movement path at the moment when the open and close judgment means confirms the opening of the gate means of the transfer destination process chamber on the withdrawal path.

* * * * *